US007355975B2

(12) United States Patent
Liu et al.

(10) Patent No.: US 7,355,975 B2
(45) Date of Patent: Apr. 8, 2008

(54) METHOD AND APPARATUS FOR GROUP COMMUNICATION WITH END-TO-END RELIABILITY

(75) Inventors: Zhen Liu, Tarrytown, NY (US);
Francois Baccelli, Meudon (FR);
Augustin Chaintreau, Paris (FR);
Anton Riabov, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 753 days.

(21) Appl. No.: 10/835,815

(22) Filed: Apr. 30, 2004

(65) Prior Publication Data

US 2005/0243722 A1 Nov. 3, 2005

(51) Int. Cl.
*H04L 1/00* (2006.01)
(52) U.S. Cl. .................. 370/235; 370/254; 370/412
(58) Field of Classification Search ............. 370/231, 370/413, 221, 235, 242, 255, 256, 389, 390, 370/394, 395.52, 224, 254, 351, 412, 428
See application file for complete search history.

(56) References Cited

U.S. PATENT DOCUMENTS

| | | | | |
|---|---|---|---|---|
| 5,331,637 | A * | 7/1994 | Francis et al. | 370/408 |
| 5,689,500 | A * | 11/1997 | Chiussi et al. | 370/235 |
| 5,909,443 | A * | 6/1999 | Fichou et al. | 370/412 |
| 6,151,300 | A | 11/2000 | Hunt et al. | |
| 6,201,792 | B1 * | 3/2001 | Lahat | 370/236 |
| 6,526,022 | B1 | 2/2003 | Chiu et al. | |
| 6,625,773 | B1 * | 9/2003 | Boivie et al. | 714/749 |
| 6,728,205 | B1 * | 4/2004 | Finn et al. | 370/217 |
| 6,999,415 | B2 * | 2/2006 | Luijten et al. | 370/230 |
| 2003/0016628 | A1 | 1/2003 | Kadambi et al. | |
| 2005/0015511 | A1 * | 1/2005 | Izmailov et al. | 709/238 |

OTHER PUBLICATIONS

International Search Report Mailed Jul. 26, 2006 in related International Application No. PCT/US05/14870.
M. Allman, V. Paxson. RFC 2581—TCP Congestion Control, available at http://www.ietf.org/rfc/rfc2581.txt (1999).
F. Baccelli and D. Hong, TCP is Max-Plus Linear and what it tells us on its throughput, ACM Sigcomm 2000, p. 219-230.

(Continued)

*Primary Examiner*—Ricky Q. Ngo
*Assistant Examiner*—Gary Mui
(74) *Attorney, Agent, or Firm*—George A. Willinghan; August Law Group, LLC

(57) ABSTRACT

The present invention addresses scalability and end-to-end reliability in overlay multicast networks. A simple end-system multicast architecture that is both scalable in throughput and reliable in an end-to-end way is used. In this architecture, the transfers between nodes use TCP with backpressure mechanisms to provide data packet transfers between intermediate nodes having finite-size forwarding buffers. There is also a finite-size backup buffer in each node to store copies of packets which are copied out from the receiver window to the forwarding buffers. These backup buffers are used when TCP connections are re-established to supply copies of data packets for the children nodes after their parent node fails, maintaining a complete sequence of data packets to all nodes within the multicast overlay network. The architecture provides end-to-end reliability, tolerates multiple simultaneous node failures and provides positive throughput for any group size and any buffer size.

44 Claims, 11 Drawing Sheets

OTHER PUBLICATIONS

F. Baccelli, A. Chaintreau, Z. Liu, A. Riabov, S. Sahu. Scalability of Reliable Group Communication Using Overlays, IEEE Infocom 2004.

S. Banerjee, S. Lee, B. Bhattacharjee, A. Srinivasan, Resilient Multicast using Overlays. Sigmetrics 2003.

C.Bormann, J.Ott, H.-C.Gehrcke, T.Kerschat, N.Seifert, MTP-2: Towards Achieving the S.E.R.O. Properties for Multicast Transport, ICCCN 1994.

Chaintreau, Baccelli and Diot, Impact of TCP-like Congestion Control on the Throughput of Multicast Group, IEEE/ACM Transactions on Networking vol. 10, p. 500-512, Aug. 2002.

Y.-H. Chu, S. G. Rao, and H. Zhang, A Case for End System Multicast, in Proceedings of ACM Sigmetrics, Jun. 2000.

S. Floyd, V. Jacobson, C. Liu, S. McCanne, and L. Zhang, *A Reliable Multicast Framework for Light-weight Sessions and Application Level Framing*, in IEEE/ACM ToN, Dec. 1997, vol. 5, No. 6, pp. 784-803.

P. Francis, Yoid: Extending the Internet Multicast Architecture, (Apr. 2000) http://www.icir.org/yoid/docs/yoidArch.ps.gz.

J. Jannotti, D. Gifford, K. Johnson, M. Kaashoek, and J. O'Toole, *Overcast: Reliable Multicasting with an Overlay Network*, in Proc. of the 4th Symposium on Operating Systems Design and Implementation, Oct. 2000.

B.N. Levine and J.J. Garcia-Luna-Aceves, A Comparison of Reliable Multicast Protocols, ACM Multimedia Systems, Aug. 1998.

J. Liebeherr, M. Nahas, Application-layer Multicast with Delaunay Triangulations, To appear in JSAC, special issue on multicast, 2003.

P. Mehra, A. Zakhor, C. D. Vleeschouwer. Receiver-Driven Bandwidth Sharing for TCP. IEEE INFOCOM 2003.

E. M. Schooler, *Why Multicast Protocols (Don't) Scale: An Analysis of Mulitpoint Algorithms for Scalable Group Communication*, Ph.D. Dissertation, CS Department, 256-80 California Institute of Technology, 2000.

S. Shi and J. Turner, Placing Servers in Overlay Net-works, Technical Report WUCS-02-05, Washington University, 2002.

G. Urvoy-Keller and E. W. Biersack, A Multicast Congestion Control Model for Overlay Networks and its Performance, in NGC, Oct. 2002.

B. Zhang, S. Jamin, L. Zhang, Host Multicast: A Framework for Delivering Multicast To End Users, in Proceedings of IEEE Infocom (2002).

\* cited by examiner

METHOD AND APPARATUS FOR GROUP COMMUNICATION WITH END-TO-END RELIABILITY

FIELD OF THE INVENTION

The present invention is directed to methods and apparatus for content delivery via application level multicast with scalable throughput and guaranteed end-to-end reliability.

BACKGROUND OF THE INVENTION

In many applications, such as Internet-based content distribution networks, a desirable means of delivering information is multicast, which is delivering information simultaneously to a chosen group of hosts. Currently a set of standards exists for supporting multicast in internet protocol ("IP") networks. However, overlay (or application-layer) multicast has become an increasingly popular alternative to network-supported IP multicast. While IP multicast is not universally available on the Internet, and requires allocation of a globally unique IP address for each communicating group, multicast overlay can be easily implemented over existing infrastructure, and no global group identifier is required.

At a high level of abstraction, an overlay network can be described as a directed communication graph where the nodes are the end-systems and an edge between any two nodes represents the path between those two nodes. In the end-system multicast architecture, one forms an overlay by establishing point-to-point connections between end-systems, where each node forwards data to downstream nodes in a store-and-forward way. The multicast distribution tree is formed at the end-system level. Such a paradigm is referred to as end-system multicast, or application-level multicast, or simply multicast using overlays. While this path may actually traverse several routers in the physical network, at this level of abstraction the path is considered as a direct link in the overlay network.

The nodes can be connected through various shapes or topologies, for example, a tree topology. The end systems participate explicitly in forwarding data to other nodes in a store-and-forward way. After receiving data from its parent node in the overlay network, a node will replicate the data on each of its outgoing links and forward it to each of its downstream nodes in the overlay network.

With the proliferation of users or hosts utilizing broadband Internet access, end-system multicast has become an increasingly practical, feasible and appealing alternative to the IP-supported multicast with its inherent deployment obstacles. Some recent studies have been conducted to examine protocol development for efficient overlay tree construction and maintenance. These studies include Y. H. Chu, S. G. Rao, and H. Zhang, *A Case for End System Multicast*, in Proceedings of ACM SIGMETRICS, June 2000, P. Francis, *Yoid: Extending the Internet Multicast Architecture*, (April 2000) http://www.icir.org/yoid/docs/yoidArch.ps.gz, D. Pendarakis, S. Shi, D. Verma, and M. Waldvogel, *ALMI: An Application Level Multicast Infrastructure*, 3rd Usenix Symposium on Internet Technologies and Systems (USITS), March 2001, B. Zhang, S. Jamin, L. Zhang, *Host Multicast: A Framework for Delivering Multicast To End Users*, Proceedings of IEEE Infocom (2002), S. Banerjee, B. Bhattacharjee and C. Kommareddy, *Scalable Application Layer Multicast*, Proceedings of ACM Sigcomm 2002, J. Liebeherr, M. Nahas, *Application-layer Multicast with Delaunay Triangulations*, To appear in JSAC, special issue on multicast, 2003, S. Shi and J. Turner, *Placing Servers in Overlay Net-works*, Technical Report WUCS-02-05, Washington University, 2002, S. Shi and J. S. Turner, *Multicast Routing and Bandwidth Dimensioning in Overlay Networks*, IEEE JSAC (2002), and A. Riabov, Z. Liu, L. Zhang, *Multicast overlay Trees with Minimal Delay*, Proceedings of ICDCS 2004.

Reliable multicast can also be implemented in overlay using point-to-point, transmission control protocol ("TCP") connections. In J. Jannotti, D. Gifford, K. Johnson, M. Kaashoek, and J. O'Toole, *Overcast: Reliable Multicasting with an Overlay Network*, Proc. of the 4$^{th}$ Symposium on Operating Systems Design and Implementation, Oct. 2000, Hypertext Transfer Protocol ("HTTP") connections are used between end-systems. In Y. Chawathe, S. McCanne, and E. A. Brewer, *RMX: Reliable Multicast for Heterogeneous Networks*, Proceedings of IEEE Infocom, 2000, TCP sessions are directly used. The main advantage of such approaches is the ease of deployment. In addition, it is argued that it is possible to better handle heterogeneity in receivers because of hop-by-hop congestion control and data recovery.

However, two issues arise from the approach of using TCP sessions directly. The first issue concerns end-to-end reliability. In case of a failure in an interior node in the multicast overlay tree, the nodes in the subtree that is rooted at the failed node need to be both re-attached to the remaining tree and re-established in TCP sessions from the point where those sessions were stopped. This issue of re-attachment to the remaining tree and re-establishment of the TCP session is referred to in the literature as the resiliency issue, which, in this context, includes the detection of failures and the reconstruction of trees.

Very recently resilient architectures have become a hot topic. For example, in S. Banerjee, S. Lee, B. Bhattacharjee, A. Srinivasan, *Resilient Multicast using Overlays*, Sigmetrics 2003, a resilient multicast architecture was proposed using random backup links. Even though nodes of re-attachment can be found and the tree reconstructed, there is no guarantee that the TCP sessions can be restarted from the point where they stopped. This limitation is due to the fact that the forwarding buffers of the intermediate nodes in the overlay network have finite size and can only maintain a certain amount of information for a certain period of time. Therefore, the packets needed by the newly established TCP sessions may no longer be in the forwarding buffers.

The second issue that arises in reliable multicast using overlays is scalability. There is a lack of understanding of the performance of TCP protocol when used in an overlay based group communication to provide reliable content delivery. Although studies have advocated the use of overlay networks of TCP connections, these studies do not address the scalability concerns in terms of throughput, buffer requirements and latency of content delivery.

In contrast, significant effort has been spent on the design and evaluation of IP-supported reliable multicast transport protocols in the last decade, as can be seen, for example, in S. Floyd, V. Jacobson, C. Liu, S. McCanne, and L. Zhang, *A Reliable Multicast Framework for Light-Weight Sessions and Application Level Framing*, IEEE/ACM ToN, December 1997, Vol. 5, Number 6, pp. 784-803, C. Bormann, J. Ott, H.-C. Gehrcke, T. Kerschat, N.Seifert, *MTP-2: Towards Achieving the S.E.R.O. Properties for Multicast Transport*, ICCCN 1994 and B. N. Levine and J. J. Garcia-Luna-Aceves, *A Comparison of Reliable Multicast Protocols*, ACM Multimedia Systems, August 1998. Other studies, for example E. M. Schooler, *Why Multicast Protocols (Don't*

Scale: *An Analysis of Multipoint Algorithms for Scalable Group Communication*, Ph.D. Dissertation, CS Department, 256-80 California Institute of Technology, 2000 and A. Chaintreau, F. Baccelli and C. Diot, *Impact of TCP-like Congestion Control on the Throughput of Multicast Group*, IEEE/ACM Transactions on Networking vol.10, p.500-512, August 2002, have illustrated that for such IP-supported reliable multicast schemes, group throughput vanishes when the group size increases. Thus these schemes suffer from scalability issues.

Some preliminary results have been reported recently on the scalability issue of overlay based reliable multicast. In G. Urvoy-Keller and E. W. Biersack, *A Multicast Congestion Control Model for Overlay Networks and its Performance*, NGC, October 2002, the authors investigated scalability issues while considering a TCP-friendly congestion control mechanism with fixed window-size for the point-to-point reliable transfer. Simulation results were presented to show the effect of the size of end-system buffers on the group throughput. In F. Baccelli, A. Chaintreau, Z. Liu, A. Riabov, S. Sahu, *Scalability of Reliable Group Communication Using Overlays*, IEEE Infocom 2004, an Additive Increase Multiplicative Decrease ("AIMD") window congestion mechanism with Early Congestion Notification ("ECN") was considered as the point-to-point reliable transfer protocol. Under the assumption that end-systems have infinite-size buffers, it was shown that such an overlay based reliable multicast has scalable throughput in the sense that the group throughput is lower bounded by a constant independent of the group size.

Therefore, the need still exists for a simple end-system multicast architecture where the transfers between end-systems are carried out using TCP and the intermediate nodes have finite size forwarding buffers and backup buffers. The multicast architecture would provide end-to-end reliability and tolerate multiple simultaneous node failures. In addition, the throughput of this reliable group communication would always be strictly positive for any group size and any buffer size.

SUMMARY OF THE INVENTION

The present invention is directed to scalable and end-to-end reliable multicast overlay networks containing a plurality of end-user nodes using the native transmission control protocol ("TCP") in combination with backpressure mechanisms to avoid data packet losses between nodes. Each intermediate node contains input and output buffers and backup buffers having a finite size. The backup buffers are used to store copies of packets that are copied out from the input buffer to the output buffer. The data packet copies stored in these backup buffers are used when TCP connections are re-established after a node failure. The backpressure mechanisms of TCP allow not only reliable point-to-point transfers, but also scalable end-system multicast.

The present invention is directed to methods and systems to provide for the re-connection of orphaned end-system nodes that are disconnected from the overlay network as a result of node failures. Multiple simultaneous node failures can be handled. Following reconnection of the orphaned nodes and any subtrees associated with these orphaned nodes, the new tree topology is communicated throughout the network, and the newly reconnected end-system nodes are supplied with copies of the data packets necessary to assure the delivery of a continuous, uninterrupted stream of data packets from the source node to each end-system node in the overlay network tree. These data packet copies are the ones stored in the backup buffers contained in each one of the nodes in the overlay network. The orphaned nodes are reconnected in accordance with the desired configuration of the overlay network and can follow, for example, a greedy heuristic arranged to optimize a particular quality of the network, e.g. throughput or to minimize an undesirable characteristic, e.g. communication delay. The present invention also provides procedures for end-system nodes to disconnect from and to join the overlay network tree that guarantee the reliability and scalability of group communication throughout the multicast overlay tree.

DETAILED DESCRIPTION

Reliable group communication requires that the same content be transported simultaneously in an efficient way from a single source to a plurality of end-users. The broadcasting of this content is made efficient by using a multicast tree structure where each node of the tree duplicates the packets it receives from its mother node and sends one of the duplicated packets to each one of its daughter nodes. In contrast to native reliable internet protocol ("IP") multicast where the nodes of the tree are Internet routers and where specific routing and control mechanisms are needed, multicast overlay uses a tree where the nodes are the actual end-systems or end-users and where currently available point-to-point connections between end-systems are the only requirement.

An edge in the overlay network tree represents the path between the two nodes that it connects. While this path may traverse several routers in a physical network, the level of abstraction used in multicast overlay networks considers the path as a direct link between end-system nodes in the overlay network tree. The end-system nodes participate explicitly in forwarding data packets to other end-system nodes in a store-and-forward way.

The point-to-point communication between nodes, for example a mother node and a daughter node, is carried out using a suitable communication protocol. Any suitable communication protocol that provides for reliable distribution or transfer of data packets between nodes within the overlay network tree and the communication of protocols and control signals among the various nodes can be used. Preferably, the communication protocol is TCP. In this embodiment, TCP is used as the point-to-point or hop-to-hop transport protocol between each pair of nodes in a given multicast overlay network. In one embodiment, Fast Retransmit Fast Recovery is implemented, as in, for example, TCP-RENO or TCP-NewRENO. An example of Fast Retransmit Fast Recovery can be found in M. Allman and V. Paxson. RFC 2581—TCP Congestion Control is incorporated by reference herein in its entirety. In one alternative embodiment, Selective Acknowledgment ("SACK") is also used. In addition, although not required, Explicit Congestion Notification ("ECN") can be used as an intermediate step in the communication protocol among nodes.

Figure 1:
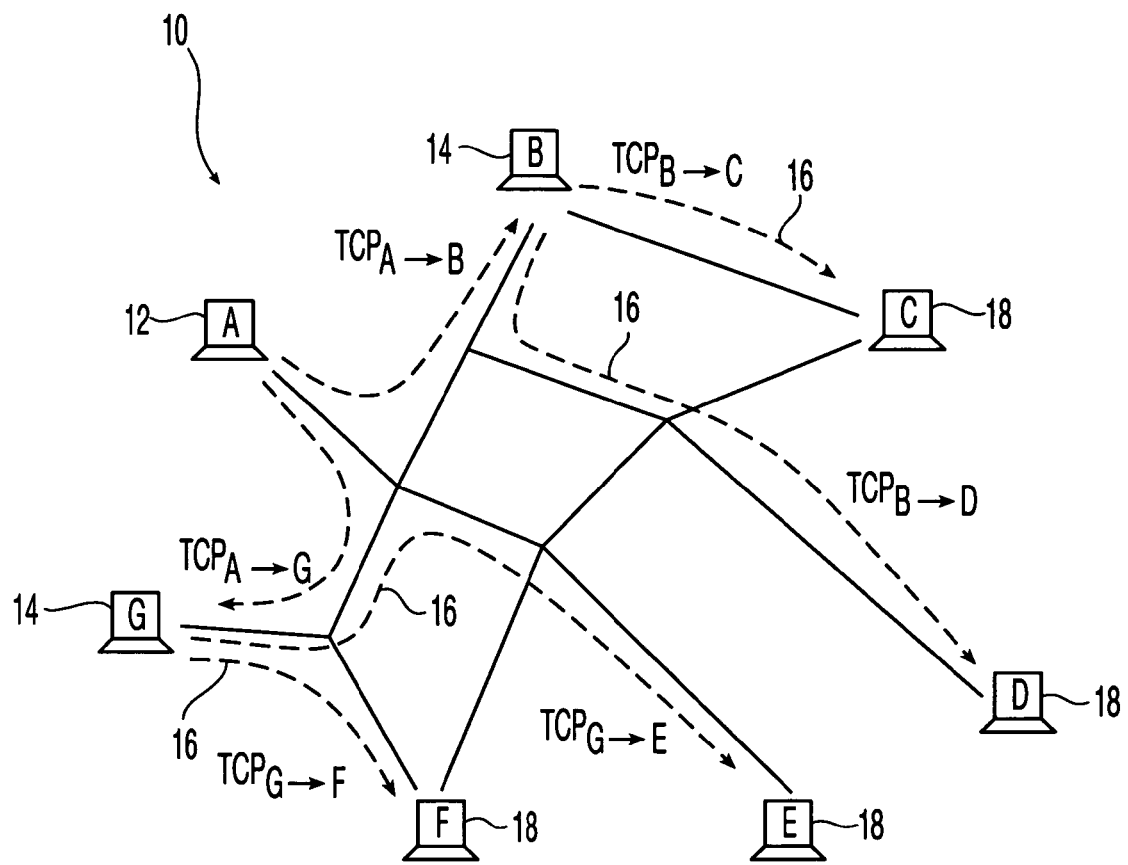
FIG. 1 is a schematic representation of a multicast overlay network in accordance with the present invention.
Figure 2:
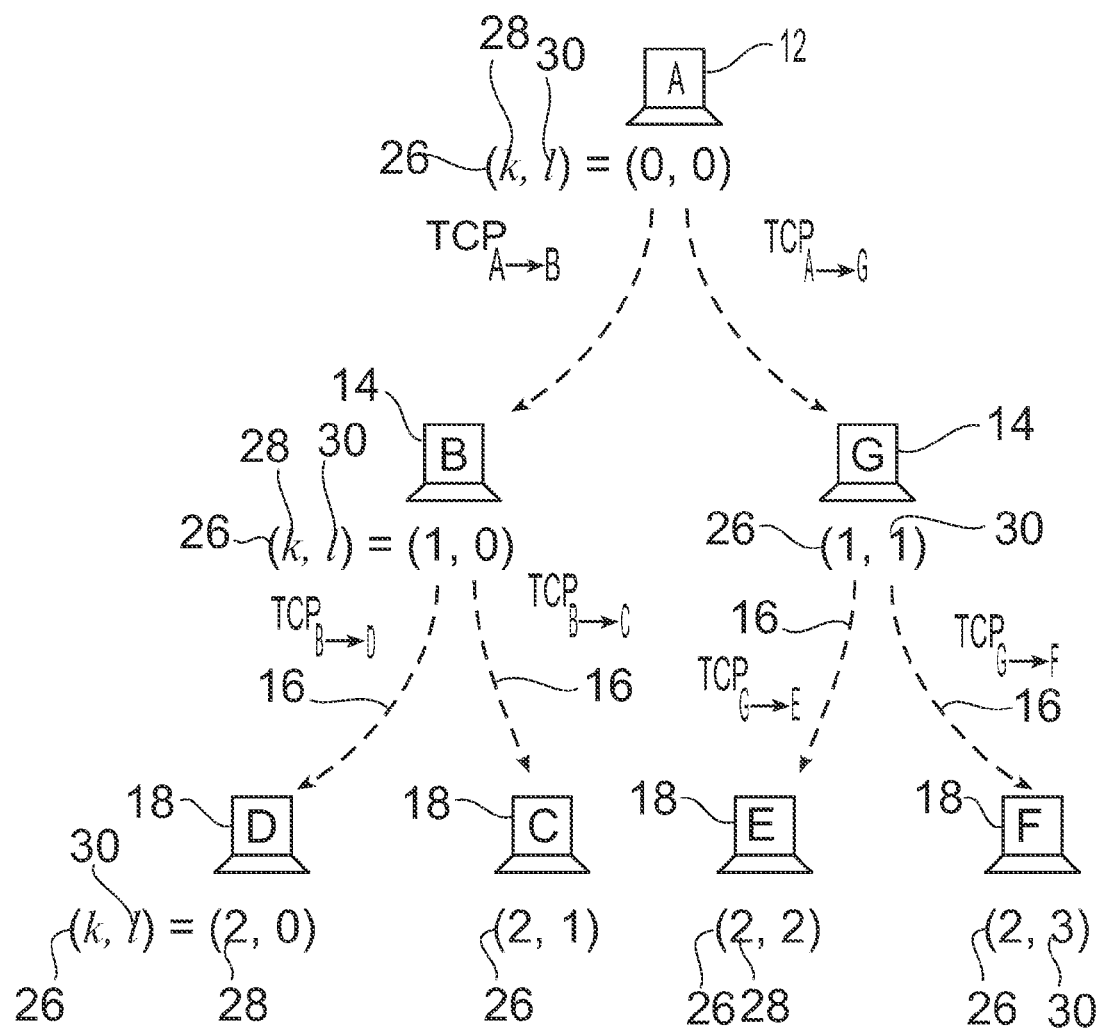
FIG. 2 is another the schematic representation of the overlay network of FIG. 1.
Figure 3:
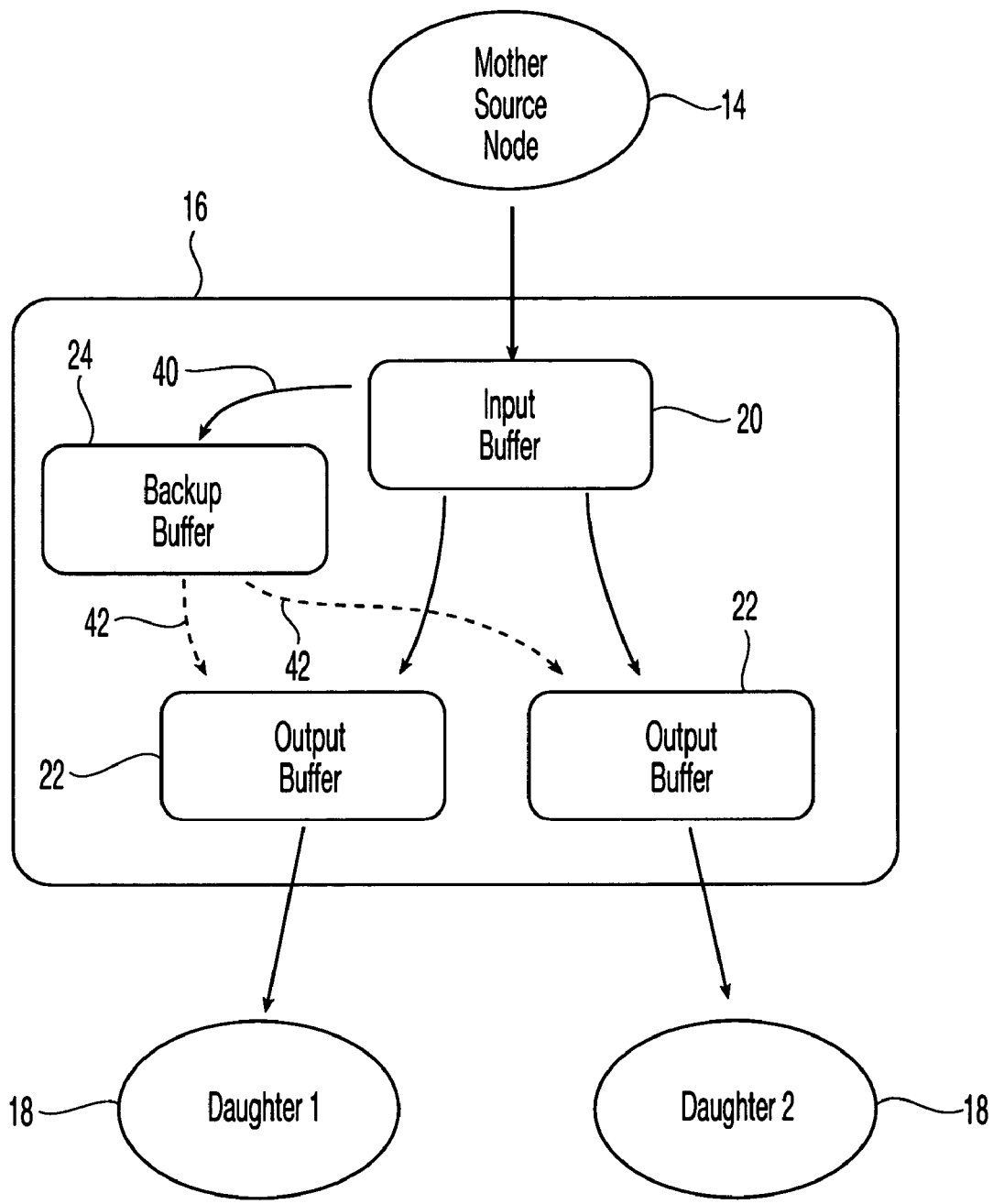
FIG. 3 is a schematic representation of an end-system node for use in the overlay network of the present invention.

As illustrated in FIGS. 1-3, in a multicast overlay network 10, a source mother node 12 sends data to one or more daughter nodes 14. After receiving data from the source mother node 12, each daughter node 14 replicates the data and, acting as a subsequent mother node, delivers a copy of the data on each of its outgoing links 16 to each one of its subsequent daughter nodes 18 in the overlay tree 10. In this overlay network 10, with the exception of leaf nodes that only receive and do not retransmit data, each node that stores and forwards packets provisions buffers for the packet forwarding purpose. As shown in FIG. 3, all nodes 16, except the source mother node 14 but including leaf nodes 18, contain an input buffer 20 corresponding to the receiver window of the upstream TCP, and, except for the leaf nodes 18, each node 16 contains several output or forwarding buffers 22. Preferably, each node 16 contains one output buffer for each downstream TCP connection or subsequent daughter node 18.

In addition, each one of a given group of nodes contains at least one backup buffer 24 in communication with the input buffer 20 and each one of the output buffers 22. In one embodiment, the group of nodes containing backup buffers includes those nodes after the source node that contain both input and output buffers. Therefore, leaf nodes, i.e. those nodes that only receive and do not retransmit data packets, would not contain backup buffers. As used herein nodes, or end-system nodes, refer to the end-system or end-users within a given multicast overlay network including leaf nodes but not including the source mother node. Each backup buffer 24 stores copies of data packets that are copied and transferred out from the input buffer 20 (receiver window) to the output buffers 22. These backup buffers 24 provide the desired amount of redundancy in the overlay network 10 and are used, for example, when re-establishing communication connections among the various nodes in the overlay network following the failure of one or more end-system nodes.

The size of the input buffer 20, output buffers 22 and backup buffer 24 for each node are selected based upon the amount of data that are forwarded through each node. The input buffer 20, output buffers 22 and backup buffer 24 usually have finite sizes or capacities. These buffer sizes can be represented as $B_{IN}$, $B_{OUT}$, $B_{BACK}$ for, respectively, input buffer 20, output buffers 22 and backup buffer 24. In one embodiment, the size of the backup buffer is given by $B_{BACK} \geq m(B_{OUT}^{max} + B_{IN}^{max}) + B_{OUT}^{max}$, where $B_{OUT}^{max}$ is a maximum output buffer size, $B_{IN}^{max}$ is a maximum input buffer size and m is the number of simultaneous node failures that can be accommodated by the data packet copies stored in the backup buffer.

In general, the topology of the multicast overlay tree 10 affects the performance of the group, i.e. the transmission of data packets through the overlay tree. For example, if the depth of the tree, i.e. the number of nodes within a tree arranged in series or sequential levels, is too large, nodes deep in the tree receive packets with long delay. In addition, if the out-degree, or spread, of the tree is too large, downstream connections compete for the bandwidth of the shared links, especially in the "last mile" of links, causing congestion and communication delays. For purposes of the present invention, the tree topologies are treated as a given, and the out-degree or fan-out of a given tree is bounded by a constant D.

From a management perspective, at least a portion of the multicast overlay tree topology is stored in one or more of the end-system nodes. Therefore, each node in which this topology information is stored has at least a partial view of the entire multicast overlay tree. Alternatively, the entire multicast overlay tree topology is stored in each one of the nodes. In one embodiment as illustrated herein, a relatively simple structure is used that allows each node to know its ancestor nodes and its entire subtree. This structure is provided for illustrative purposes only, and the present invention is not limited to this type of structure. Alternative architectures can also be implemented in accordance with the present invention.

Since various multicast overlay tree topologies can be used in accordance with the present invention, a generic notation is used to refer to the various nodes within a given tree topology. Referring to FIG. 2, each node is assigned a numbered pair (k,l) 26 that designates the location of the end-system in the multicast tree. The first index, k, 28 is the distance to the source node 12 or root of the tree, also referred to as the level. The second index, l, 30 permits the numbering of multiple end-systems within the same level. For a complete binary tree, all of the end-systems on the same level or within the same distance, k, from the source node are labeled by numbers $l=0, \ldots, 2_k-1$. As illustrated, the complete binary tree has a highest level of two, k=2, and l=0,1,2,3.

In addition, the mother node of node (k,l) is denoted (k−1,m(k,l)). The daughter nodes of node (k,l) are labeled (k+1,l') with l'∈ d(k,l). For a complete binary tree, m(k,l) =$\lfloor l/2 \rfloor$ and d(k,l) is $\{2l,2l+1\}$.

The present invention is directed to a providing for reliable transfer and forwarding of data packets between nodes in the multicast overlay tree with scalable throughput and guaranteed end-to-end reliability. In one embodiment, a method in accordance with the present invention includes preventing data packet losses between nodes in the multicast overlay tree using communication protocols and backpressure mechanisms. As used herein, back-pressure mechanisms in general, and in particular the back-pressure mechanisms of TCP, refer to the mechanisms or algorithms used to avoid frame or data packet loss within an overlay network tree by sending impede signals back through the network, for example to sender or mother nodes, when the input or output buffers contained in end-system nodes disposed farther down the tree are reaching capacity.

Three different types of packet losses are possible in multicast overlay. The first type is losses that occur in the path between the end-system nodes (sender and receiver or mother and daughter). In one embodiment, the present invention avoids or recovers these first losses by using TCP to transfer data packets between end-system nodes. In particular, the present invention relies upon the acknowledgment and retransmission mechanisms within TCP.

The second type is losses due to overflow in input buffers located in the end-system nodes. In accordance with the present invention, the second losses are addressed by the backpressure mechanism of the communication protocol used to forward data packets through the multicast tree. In one embodiment, the protocol is TCP and the back-pressure mechanisms include RENO for single packet data loss, NewRENO for multiple losses or errors and SACK. Alternatively, ECN can also be used. In one embodiment of the backpressure mechanism, the available space in an input buffer at a given receiver node is communicated to other nodes in the tree, for example to the sender or mother node of the given node. In one embodiment, this is communicated through the acknowledgment protocols ("ACK") of TCP. The acknowledgment packet sent by the given node of the TCP connection contains the space currently available in its input buffer or receiver window. In response to the space information sent by the receiver node, the sender node will not send or forward a new data packet unless the new packet, as well as any other "in-fly" packets, will have sufficient space in the input buffer. In addition to notifying sender nodes of the available space in the input buffer, when there is a significant reduction in the available space in the input buffer the given receiver node sends a notification to other nodes in the overlay tree, for example using a special data packet sent to the source node. In one embodiment, notification is sent when the buffer space differs by a factor of about two times the Maximal Segment Size (MSS) or more.

The third type is losses due to overflow in output buffers located in the end-system nodes. These third type losses can occur, for example, during the process of copying data packets and sending the copies to the output buffers. In one embodiment, backpressure mechanisms are also used to prevent this type of losses. In accordance with the present invention, a data packet is removed from an input buffer of a given end-system node only after that data packet is copied to all of the output buffers of that end-system node. The copy process is blocked unless sufficient space exists in the output buffer to accommodate the data packet. Copying and transferring are resumed once there is sufficient room for one data packet in that output buffer. Thus, this "blocking" backpressure mechanism eliminates overflow at the output buffers of the end-system nodes that can result from sending more data packets to an output buffer than the output buffer has capacity to handle. Therefore, the architecture used in accordance with the present invention avoids the third type of data packet loss. The back-pressure mechanisms used in accordance with the present invention avoid data packet losses at the overlay nodes even for finite-sized buffers. Therefore, the present invention facilitates the use of finite sized input and output buffers.

The present invention also addresses the issue of re-sequencing delays that are due to packet losses, which can significantly impact the throughput, and hence scalability of the group communication. When a data packet is lost along a path in the overlay network tree, the communication protocol, for example TCP, eventually retransmits the lost data packet. However, the order or sequencing of data packets can become scrambled as a result of these retransmissions. For example, some data packets with larger sequence numbers, indicating that these data packets were forwarded later and should follow the retransmitted data packet, will arrive at a given node before the duplicate retransmitted data packet arrives. A given node copies and forwards data packets from an input buffer to an output buffer in sequence. Therefore, the earlier arriving data packets with the larger sequence numbers will not be copied out to forwarding buffers until after the duplicate retransmitted data packet arrives and is forwarded.

For a given node, a delay in packet processing will have negligible impact on that node's throughput. The processing delay, however, creates perturbations in the overall flow of data packets in the overlay network. These perturbations appear as bursts of data packets arriving at subsequent downstream nodes and can cause significant performance degradation in downstream paths between nodes. The perturbations emanating from one node can also produce ripple effects in subsequent subtrees. In addition, these performance degradations can impact the source node sending rate, and hence group communication throughput, as a result of back pressure mechanisms.

Resiliency in an end-system multicast network concerns the handling of node failures and nodes departures within the overlay network. These failures and departures often occur without prior notice or warning. Therefore, in one embodiment, the present invention provides reliable data packet transfer between nodes in the multicast overlay network after the detection of a failure in at least one node. Reliable data packet transfer can be provided in conjunction with or independent of the prevention of packet losses using communication protocols and backpressure mechanisms in accordance to with the present invention. The present invention is also directed to the computer executable codes used to implement these algorithms in local and wide area networks and to the computer readable medium containing these codes.

In one embodiment, the present invention detects at least one end-system node failure in the multicast overlay tree. Preferably, the present invention provides for the simultaneous detection of a plurality of node failures and reliable data transfer after a plurality of node failures are detected. Since communication protocols such as TCP do not always provide a reliable and efficient mechanism for detecting nodes that are not responding, other methods are needed to detect failures. Suitable methods for detecting node failures in accordance with the present invention include heartbeat probes and keep-alive signals. For heartbeat probes, a heartbeat message is sent via user datagram protocol ("UDP") at regular time intervals to all neighbor nodes of a given node. Missing heartbeats from a neighbor node signal a node failure or node departure. A keep-alive messaging system can be established in a similar way.

When a node failure is detected, the multicast overlay tree is reconfigured so that the orphaned nodes of the failed node and the subtrees rooted at these orphaned nodes are re-attached or reconnected to the original multicast tree while maintaining the delivery of a complete sequence of data packets from the source node to each one of the remaining end-system nodes. Orphaned nodes of the failed end-system node include all nodes downstream of the failed node that derived or received data packets from the failed end-system node. Orphaned nodes include orphaned daughter nodes that were daughters of the failed node and end-system nodes contained in subtrees rooted in these orphaned daughter nodes. In one embodiment, a new node connection, for example a new TCP node connection, is established after the reconnection of each orphaned node. The new nodes used to re-attach the orphaned nodes can be thought of as substitute mother nodes for the orphaned nodes of the failed node. Various methods can be used to re-configure the multicast tree. Suitable methods for use with the present invention are discussed below.

In another embodiment of the method of the present invention, a plurality of simultaneous end-system node failures are detected, and the all of the orphaned end-system nodes are simultaneously reconnected to the multicast overlay tree.

This reconfiguration is completed by distributing information about the newly configured subtrees back up the tree to the root or source mother node and by distributing ancestor tree information down the tree to the newly reconnected subtrees. In one embodiment, the distribution of the topology information about the newly configured subtrees is initiated by the mother node and the daughter nodes of the failed node, and the distribution of the ancestor tree information is initiated by the "step-mother" nodes.

Achieving end-to-end reliability after the identification of a failed or departed node and the reconnection of the orphaned nodes and subtrees of the failed or departed node includes ensuring the data integrity in addition to resiliency of the tree structure. Ensuring data integrity includes providing the new substitute mother nodes, or "step-mother" nodes, with data that are old enough so that the reconnected daughter nodes and the offspring of these daughter nodes receive complete sequences of data packets from the source mother node. In the present invention, the backup buffers located in each end-system node are used to ensure data integrity by storing the copies of the data packets that are through the substrees after the orphaned nodes are reconnected. As used herein, a complete sequence of data packets contains all of the data packets necessary to provide an end-system node with a sufficiently complete and uninterrupted data stream to the service or information provided from the source node, e.g. a complete video conference, a complete movie or a complete audio broadcast. When a new connection is established, the data packets in the backup buffer of the sender node that is creating the new connection are copied to an output buffer in that sender node that corresponds to the new connection. Since the backup buffer contains copies of older data packets that have already been copied from the input buffer to the output buffer, the sender node starts with data packets in its output buffer that are older and have smaller sequence numbers than those currently in the input buffer of the sender node.

The size of the backup buffer is selected to hold enough data to provide for a sufficient amount of older data being delivered to the output buffer. In one embodiment as is discussed in more detailed below, the size of the backup buffer is selected to be large enough compared to those of input and output buffers, so that end-to-end reliability can be provided even when there are multiple simultaneous node failures or departures. For example, if $B_{OUT}^{max}$ and $B_{IN}^{max}$ are the maximum sizes of the output and input buffers respectively for a given node, then the backup buffers can be of the size:

$$B_{BACK} \geq m(B_{OUT}^{max}+B_{IN}^{max})+B_{OUT}^{max} \quad (1)$$

in order to tolerate m simultaneous node failures and departures. In accordance with this embodiment of the present invention, the daughter nodes of each failed or departed node can be re-attached to any of the nodes in the subtree rooted at the m-th generation ancestor of the failed or departed node.

The backup buffer architecture used in accordance with the present invention to ensure end-to-end reliability is very simple. In particular, this architecture can be implemented at the application level, and there is no need to search for end-system nodes possessing data packets having the right sequence of numbers for use with each one of the orphaned nodes to be re-attached.

The present invention also addresses the procedures for nodes to leave or join the multicast overlay tree. Although conventionally UDP has been used for real time applications, TCP is a preferable alternative to UDP, in particular for multimedia applications because of advantages including fair bandwidth sharing and in-order data packet delivery. In addition, TCP can pass through client imposed firewalls that may only permit HTTP traffic. Since the end-system based reliable multicast architecture of the present invention can be deployed to broadcast live events, procedures for nodes or end-users to actively leave or join an ongoing live broadcast are used.

In one embodiment, the procedure for a node to leave or be removed from the multicast overlay tree includes the notification of the departure or removal to the mother node and daughter nodes of the node to be removed followed by disconnecting the corresponding TCP sessions. The overlay network tree is then reconfigured as for a node failure. When a node is added to or joins the group of nodes in an overlay network, that node contacts the source mother node which provides the new node with the necessary information about its mother node. The new node then establishes a TCP connection with the designated mother node. In addition for purposes of end-to-end reliability in the new tree, the source mother node also notifies the new node about the constraints on the buffer sizes so that the input and output buffer sizes in the new node do not exceed $B_{IN}^{max}$ and $B_{OUT}^{max}$ respectively and the backup buffer size satisfies inequality (1). The leave and join procedures are completed by the topology information update processes as used in the node failure case.

Avoiding interruption in the data packet sequence may not be trivial, especially for nodes distant from the root, since the packets that these nodes were receiving at the time of failure may have been already processed and discarded by all other group members, except for the failed node. Therefore, the backup buffers are used to create copies of stream content, i.e. data packets that could be otherwise lost during node failure. As illustrated in FIG. 3, when data packets move from the input buffer 20 to the output buffers 22, a copy of each data packet leaving input buffer is saved 40 in the backup buffer 24. The backup buffer can then be used to restore data packets that were lost during node failure by transmitting copies 42 to the output buffers 22 for forwarding to daughter nodes 18.

End-to-end reliable group communication with tolerance to m simultaneous failures in accordance with the present invention can be defined as removing simultaneously m nodes from the multicast tree, simultaneously reconnecting all of the orphaned nodes, continuing transmission and supplying all remaining nodes with a complete transmission of data packets from the source mother node. In other words, a failure of m nodes does not lead to any changes in the sequence or content of the stream received at the remaining nodes. However recovering from failure may incur a delay, which is required to restore connectivity.

During the time when the overlay network is recovering from m failures, it is not guaranteed to recover correctly from any additional failures. However if l, for some $1 \leq l \leq m$, failures occur, the system will be able to recover from additional (m −l) failures even if the failures happen before the system has completely recovered. In such situations new failures occurring during recovery will increase total recovery time. For example, if $B_{OUT}^{max}$ and $B_{IN}^{max}$ are the maximum sizes of output and input buffers in the system, respectively, a backup buffer of order r has a size (r·

$(B_{OUT}^{max}+B_{IN}^{max})+B_{OUT}^{max})$. Wherein the order r is defined as the number of simultaneous failures that can be handle by the system and method of the present invention.

In one embodiment, the following algorithm is used to recover from failures. Node (k', l') is the surviving ancestor of node (k, l), if the mother node of node (k, l) did not survive the failure and (k', l') is the first surviving node on the path from (k,l) to the source mother node. Each disconnected end-system (k,l) is reconnected to a node that belongs to the subtree of the surviving ancestor (k',l'). After connection is restored, the node (k',l') retransmits all packets contained in its backup buffer. Then it continues the transmission, reading from input buffer and writing to output buffer. Intermediate nodes on the new path from (k',l') to (k,l), as well as all nodes in the entire subtree of (k,l), are able to ignore the packets that they have already received, and simply forward them to downstream nodes.

Therefore, the end-to-end reliability in accordance with the present invention can be expressed by the following theorem. An multicast overlay system with backup buffer of size $(m \cdot (B_{OUT}^{max}+B_{IN}^{max})+B_{OUT}^{max})$ is end-to-end reliable with tolerance to m failures.

In order to prove this assertion, a chain of nodes $(k_1,l_1) \rightarrow (k_2, l_2) \rightarrow (k_3,l_3)$ is considered. $W^{(k_{i+1},l_{i+1})}$ is the size of the receiver window on the TCP connection $(k_{i+1},l_{i+1})$, for i=1,2. If a failure of node $(k_2,l_2)$ is detected, node $(k_3,l_3)$ connects to node $(k_1,l_1)$ and request it to re-send packets starting from packet number t+1, where t is the number of the last packet that node $(k_3,l_3)$ received. The number of packets stored in input and output buffers at node $(k_2,l_2)$ plus the number of packets 'in-fly' to and from node $(k_2,l_2)$ is at most $(B_{OUT}^{max}+B_{IN}^{max})$. This bound is guaranteed by TCP's choice of receiver window size. At most $W^{(k_2,l_2)}$ packets will be 'in-fly' to node $(k_2, l_2)$, and $W^{(k_2,l_2)}$ does not exceed the amount of free memory in the input buffer node $(k_2,l_2)$. Similarly, at most $W^{(k_3,l_3)}$ packets will be 'in-fly' to node $(k_3,l_3)$, but they are not removed from the output buffer of node $(k_2,l_2)$ until $(k_3,l_3)$ acknowledges that it has received the packets. Therefore the difference between the smallest packet number at node $(k_1,l_1)$ and the highest packet number at node $(k_3,l_3)$ does not exceed the sum of buffer sizes at node $(k_2,l_2)$. During re-transmission the application at node $(k_1,l_1)$ does not have access to the output socket buffer, and may need to re-transmit the contents of this buffer as well. Hence the total number of packets that need to be retransmitted is bounded by $B_{OUT}^{max}+(B_{OUT}^{max}+B_{IN}^{max})$, which is the size of an order 1 backup buffer.

If $(k_2,l_2)$ has more than one daughter node, each of the daughter nodes will require at most $B_{OUT}^{max}+(B_{OUT}^{max}+B_{IN}^{max})$ packets to be re-transmitted, and the same backup buffer of order 1 will provide all necessary packets.

If more than one failure occurs, and there is more than one failing node on the path from disconnected node (k, l) to it's surviving ancestor node (k', l'), the surviving ancestor node may need to re-transmit the contents of input and output buffers at all failing nodes on the path, plus the contents of output buffer at (k', l'). Since the number of failing nodes is bounded by m, the theorem is proven.

In fact, the definition of tolerance of failures used standard notion in the fault tolerance literature; therefore, the above proof actually proves a much stronger result, which is stated as a corollary here:

A multicast overlay system with backup buffer of size $(m \cdot (B_{OUT}^{max}+B_{IN}^{max})+B_{OUT}^{max})$ is end-to-end reliable with tolerance to m simultaneous and consecutive failures in a chain of the tree.

A multicast overlay tree in accordance with the present invention allows nodes to leave and join the group during transmission. Leaving nodes can be handled by the failure recovery method described above. In one embodiment for nodes joining the overlay network, a node joining the transmission may want to connect to a distant leaf node, which is processing packets of the smallest sequence numbers, so that the newly joined node can capture the most transmitted data. However, if delay is an important factor, a joining node can connect to a node as close to the root as possible. In practice, the maximum number of down-links for each node is limited, due in particular to the last-mile effect, and not every node in the multicast group can accept new connections. Therefore the uplink node for a new connection is chosen from "active" nodes that have not yet exhausted their capacity.

The procedure for restoring connectivity after a failure is similar to the join procedure, but for node failures the choice of substitute mother nodes is further limited to a subtree of a surviving ancestor of the failed node. In applications where communication delay is to be minimized, the goal is to maintain a tree as balanced as possible, subject to the degree constraint. Therefore, in one embodiment, a greedy heuristic is used to restore connectivity. In one embodiment, the greedy heuristic minimizes overall tree depth, subject to the degree constraint, by reconnecting the longest subtrees to nodes that are as close to the root or source node as possible. An algorithm, call for example the GREEDY_RECONNECT algorithm, is described below for the case of one node failure, but the case of multiple simultaneous node failures can be handled as a sequence of single failures.

First, suppose node (k,l) fails. Let S be the set of orphaned subtrees, rooted at daughters of (k,l). Let A be the set of active nodes in subtree of (k−1,m(k,l)), but not in the subtree of (k,l). Next, choose a node (k+1,l') ∈ S that has subtree of largest depth. Then, choose a node (p, q) ∈ A that is closest to the source, and connect (k+1,l') to (p, q). Then, update S←S\{(k−1,l')} and add active nodes from subtree of (k+1, l') to A. This process is completed until S is not empty, that is until all of the subtrees have be reconnected.

Depending on the objective function, other approaches can be considered. In another embodiment, for example, if throughput is to be maximized, and last-mile links have limited bandwidth, then lower fan-out provides higher throughput, and the optimal topology could be a chain. In yet another embodiment, if delay is to be minimized, the optimal configuration is a star where all the nodes have direct connections with the source node. In addition, if no specific goals are set, a random choice of uplink node (still subject to fan-out constraints) is used.

The reliable multicast overlay architecture in accordance with the present invention is scalable in the sense that the throughput of the group is lower bounded by a positive constant irrespective of the size of the group. Even in a multicast tree of infinite size with the back-pressure mechanisms, the group throughput is positive. This is an unexpected result in view of the preliminary simulation results reported in G. Urvoy-Keller and E. W. Biersack, *A Multicast Congestion Control Model for Overlay Networks and its Performance*, in NGC, October 2002, and also contrasts with the non-scalability results reported in the literature on IP-supported reliable multicast.

The proof of the scalability of the multicast overlay architecture in accordance with the present invention is made under the set of stochastic assumptions described below and covers both the backpressure (ECN marking) and the node failure reconnection. The models used in the proof are described under several related formalisms. The first formalism is random graphs which adequately represent all the required mechanisms and which are instrumental in the mathematical proofs of rate scalability. The second formalism is Petri nets which can be seen as some sort of folding of the above random graphs and which give a more global and visual representation of the network topology and control. The third formalism is (max,plus) recursions which are linked to maximal weight paths in the random graphs and to the group throughput. These recursions turn out to be the most efficient way of simulating this new class of objects.

Figure 4:
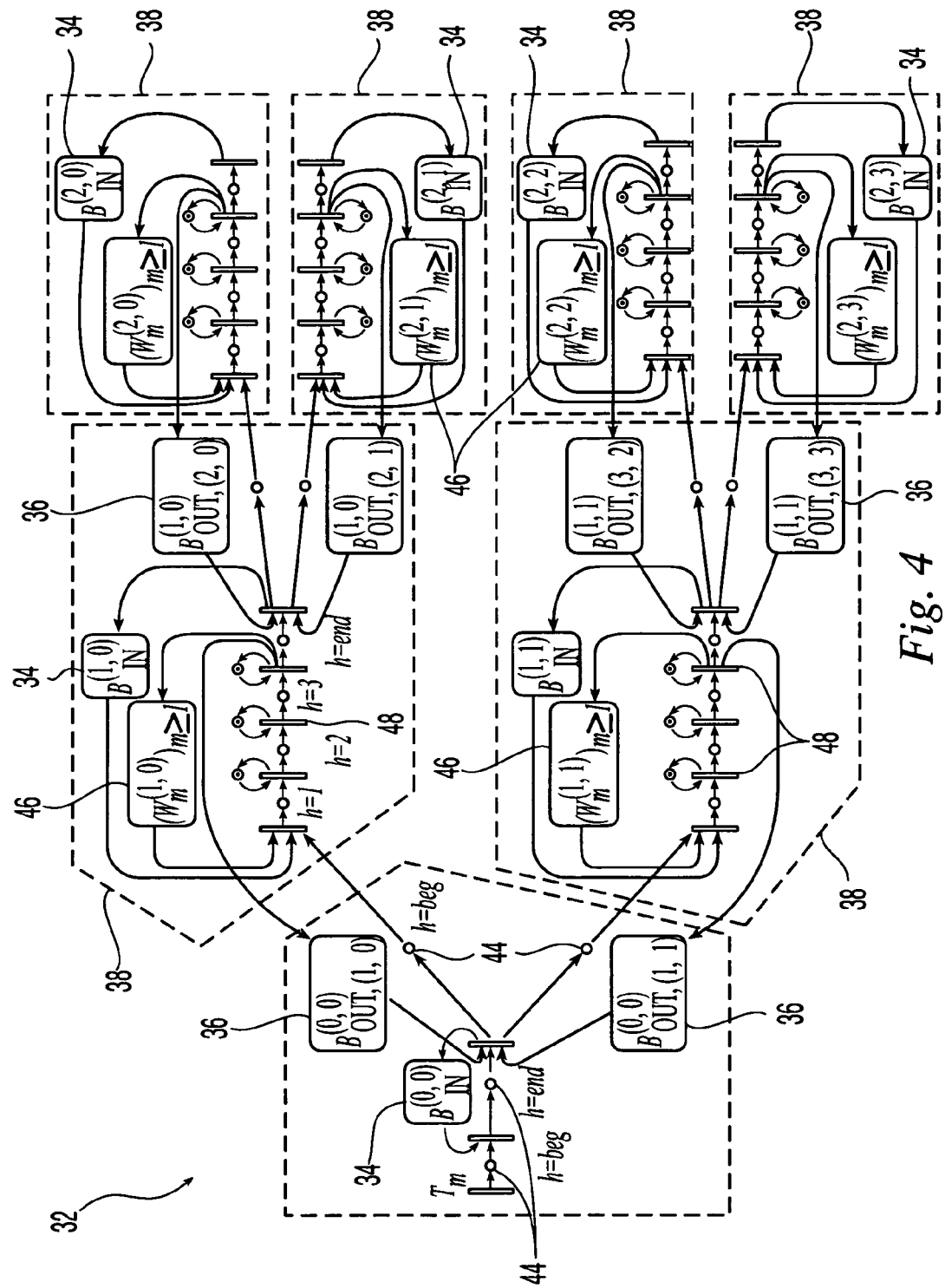
FIG. 4 is a schematic representation of a binary tree of height two with input and output blocking in accordance with the present invention.
Figure 5:
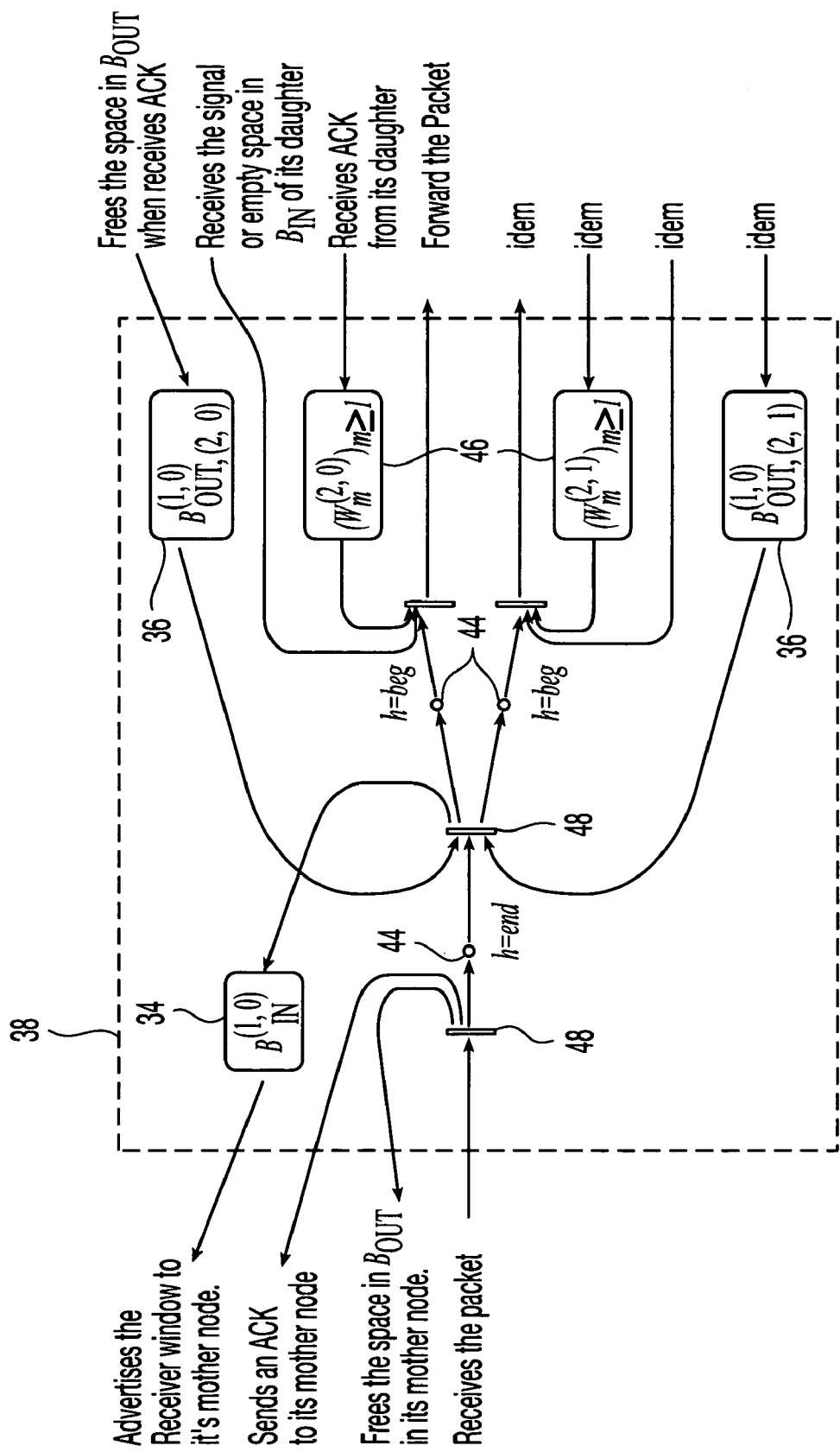
FIG. 5 is a schematic representation of a single node from FIG. 4.

Referring to FIG. 4, an example of a binary tree 32 of height 2 with input and output blocking (backpressure) is illustrated. This binary tree 32 illustrates a model for the loss-free marking in a Petri net like formalism. The blocking mechanisms associated with backpressure mechanisms are implemented at the input buffers 34 and output buffers 36 of each node or end-system 38. A single end-system node 38 of the binary tree 32 is illustrated in greater detail in FIG. 5. As illustrated in FIGS. 4 and 5, each end-system node 32 is identified or labeled according to the index notation (k,l) that was described above. For each end-system node (k,l) the size of each input buffer 34 is denoted $B_{IN}^{(k,l)}$, and the size of each output buffer 36 is denoted $B_{OUT,(k',l')}^{(k,l)}$ for the output corresponding to the connection to subsequent or daughter end-system (k',l'). The sizes of both the input and output buffers are measured in data packets. For the purposes of simplicity, all packets are said to be of the same size.

Although other types of communication protocols can be used, preferably the connections between end-systems are TCP connections. As illustrated in the figures, similar notations are used for the TCP connections. For example, TCP connections to end-systems designated (k,l) are labeled with a corresponding index designation (k,l). In addition, each TCP connection follows a route that contains a sequence of routers in series designated $H_{(k,l)}$. Routers of TCP connection (k,l) are labeled by index h=1,2, . . . ,$H_{(k,l)}$. Each router is represented as a single server queue. The input buffer of router h of connection (k,l) is represented as a place in the Petri net having the label (k,l,h). In FIGS. 4 and 5, these places in the Petri net are represented by circles 44. The place designated (k,l,beg) of TCP connection (k,l) represents the output buffer of end-system (k−1,m(p)). Similarly, the place (k,l,end) represents the input buffer of end-system (k,l). The notation for index h is indicated in FIG. 4 for the TCP connection (1,0).

The window size sequence for TCP connection (k,l) is represented as $(W_m^{(k,l)})_{m \geq 1}$, 46. More precisely, $W_m^{(k,l)}$ is the window size seen by packet m. This sequence takes its values in the set $\{1,2, \ldots ,W_{max}\}$, where $W_{max}$ is the maximum window size. For the purposes of illustration, the following random evolution, corresponding to TCP RENO's congestion avoidance AIMD rule, is assumed for this sequence. A random additive increase rule applies so that when it is equal to w, the window increases by one Maximum Segment size (MSS) for every w packets, as long as there is no packet marking. When a packet is marked by one of the routers, a multiplicative decrease rule applies, and the window is halved. For practical purposes, an integer approximation of halving is used to keep the window in the set $\{1,2, \ldots ,W_{max}\}$. Similarly, if the window is equal to $W_{max}$ it remains equal to this value until the first packet marking. If one assumes packets to be marked independently with probability p(k,l), then $(W_m^{(k,l)})_{m \geq 1}$ is an aperiodic and ergodic Markov chain.

Regarding the processing of packets through the quasi Petri net illustrated in FIGS. 4 and 5, tokens are used to represent data packets, acknowledgments or, generally, control events associated with scheduling or back-pressure mechanisms. Tokens move from place to place according to the processing rules associated with transitions (represented in the figures by bars 48). The general rule in such a Petri net is that the processing of a token by a transition takes place as soon as a token is available in each of the places upstream of this transition. One token is then consumed from each place upstream and one token is created in all places downstream of the transition, after some random processing time, which depends on the transition.

For example, tokens representing packets of the group communication are created at the source located on the left part of the figure. These tokens are processed from place to place, namely from buffer to buffer depending on the conditions defined by the processing rules and with the delays associated with the random processing times. As illustrated, transitions leading to a place with h=beg and h=end have a null processing time. The other transitions are modeling the first-in-first-out ("FIFO") routers along a route. The processing times in these transitions are random variables describing the impact of cross traffic on the processing of packets of the group communication through the router/link. The random processing time of packet m through router (k,l,h) is denoted by $\sigma_m^{(k,l,h)}$ and is referred to as the Aggregated Service Time of packet m. The fact that the packets of a TCP connection are scheduled in a FIFO way in each router is represented by the local feedback loop with one token attached to each router. As illustrated in FIG. 4, these local loops are only represented on the rightmost TCP connections for the sake of readability and clarity. As a consequence of such a local loop, packet m can only start its service time in a router after packet m−1 has left.

The other feedback arcs represent the various flow control and back-pressure mechanisms. The associated places have been expanded to boxes and labeled with the number of tokens initially present in the place. The initial condition of the Petri net is with all its places representing buffers empty of tokens, i.e. the multicast has not started yet and all input and output buffers are empty.

The feedback arc with place labeled $B_{IN}^{(k,l)}$ represents the advertisement of the receiver window size of end-system node (k,l) back to its mother node. Since the total number of tokens in the cycle made of the place on this arc and of the places (k,l,1), (k,l2), . . . ,(k,l,end) is an invariant and remains equal to $B_{IN}^{(k,l)}$, when the total number of in-fly packets of TCP connection (k,l) added to the number of packets in the input buffer of end-system node (k,l) is equal to $B_{IN}^{(k,l)}$, then the place of this feedback arc has no token left, so that the transition downstream of place (k,l,beg) is blocked.

The feedback arc with place labeled $B_{OUT,(k',l')}^{(k,l)}$ represents the blocking of the stream out of the input buffer of end-system node (k,l) because of a lack of space in the output buffer associated with TCP connection (k',l'). This arc stems from the transition upstream of place (k',l',end) rather than from that downstream of place (k',l',beg), because packets are only deleted from this output buffer when acknowledged by the receiver of TCP connection (k',l').

The feedback arc labeled with the congestion window $(W_m^{(k,l)})_{m \geq 1}$ represents the dynamic window flow control of TCP; however, this arc is not behaving as in a classical event graph, as the size of the window is changing with time.

In the Petri net model, each packet was acknowledged. In current TCP implementations, however, an acknowledgment can be sent for every second segment. This can be taken into account by saying that packets in the above-described Petri net represent the transmission of two segments in the TCP connection. Based on this assumption, an "abstract packet" size of 2×MSS can be used in the model. The process $W_m$, being an integer expressed in abstract packets, can then be equal to the integer part of CWND/(2×MSS) where CWND is the Congestion Window given for the TCP protocol. The value then increases by MSS/(2×MSS)=½ for each window successfully transmitted, i.e. the value of $W_m$ is increased by 1 after the successful transmission of $2W_m$ packets.

To construct an evolution equation, the time when packet m is available at the source node is denoted $T_m$. For a saturated input case, all packets are ready at the source from the beginning of the communication and $T_m=1$. The time when transition (k,l,h) completes the transmission of packet m is denoted $x_m^{(k,l,h)}$. By convention $x_m^{(k,l,beg)}$ is the time when packet m departs from the output buffer of the source node of TCP connection (k,l) (that is the buffer with size $B_{OUT,(k,l)}^{(k-1,m(k-1,l))}$). Similarly, $x_m^{(k,l,end)}$ is the time when packet m departs from the input buffer of the receiver node of TCP connection (k,l) (that is from the buffer with size $B_{IN}^{(k,l)}$). The dynamics of the model presented in the last subsection is given by the following set of equations (where v denotes the maximum).

$$x_m^{(0,0,beg)} = T_m \vee x_{m-B_{IN}^{(0,0)}}^{(0,0,end)}, x_m^{(0,0,end)} = x_m^{(0,0,beg)} \vee \left( \bigvee_{l \in d(o,o)} x_{m-B_{OUT,(1,l)}^{(0,0)}}^{(i,l,H_{(1,l')})} \right)$$

and for $k \geq 1, l \geq 0$, $$x_m^{(k,l,beg)} = x_m^{(k-1,m(k,l),end)} \vee x_{m-B_{IN}^{(k,l)}}^{(k,l,end)} \vee x_{m-W_m^{(k,l)}}^{(k,l,H_{(1,l')})}$$

$$x_m^{(k,l,1)} = \left( x_m^{(k,l,beg)} \vee x_{m-1}^{(k,l,1)} \right) + \sigma_m^{(k,l,1)}$$

$$x_m^{(k,l,H_{(k,l)})} = \left( x_m^{(k,l,H_{(k,l)}-1)} \vee x_{m-1}^{(k,l,H_{(k,l)})} \right) + \sigma_m^{(k,l,H_{(k,l)})}$$

$$x_m^{(k,l,end)} = \left( x_m^{(k,l,H_{(k,l)})} \vee \left( \bigvee_{l' \in d(k,l)} x_{m-B_{OUT,(k+1,l')}^{(k,l)}}^{(k+1,l',H_{k+1,l'})} \right) \right)$$

To find a path of maximum weight in a random graph, consider the random graph where the set of vertices is $V=\{(0,0,beg,m),(0,0,end,m)|m \in Z\} \cup \{(k,l,h,m),k \geq 1, l \geq 0, h \in \{beg,1,2,\ldots,H_{(k,l)},end\}|m \in Z\}$ The weight of a vertex (k,l,h,m) is given by $\sigma_m^{(k,l,h)}$ for $h \in \{1,2,\ldots,H_{(k,l)}\}$ and $m \geq 1$, and is equal to zero for $h \in \{beg,end\}$. The weight is $-\infty$ for any vertex with $m \geq 0$.

The set of edges is given by $E_1 \cup E_2 \cup E_3 \cup E_4 \cup E_5$, where:

$E_1=\{(0,0,end,m) \rightarrow (0,0,beg,m)|\forall m \in Z\} \cup$ $\{(k,l,1,m) \rightarrow (k,l,beg,m),(k,l,end,m) \rightarrow (k,l,H_{(k,l)},m) | \forall k \geq 1, l \geq 0, m \in Z\}$ $\cup \{(k,l,m,h) \rightarrow (k,l,h-1,m)|$ for $h=2,\ldots,H_{(k,l)}$ and $\forall k \geq 1, l \geq 0, m \in Z\}$ $\cup \{(k,l,beg,m) \rightarrow (k-1,m(k,l),ebd,m)|\forall k \geq 1, l \geq 0, m \in Z\}$, $E_2=\{(k,l,h,m) \rightarrow (k,l,h,m-1)|$ for all values of $h$ and $\forall k > 1, l \geq 0, m \in Z\}$ $E_3=\{(k,l,beg,m) \rightarrow (k,l,H_{(k,l)},m-W_m^{(k,l)})|\forall k \geq 1, l \geq 0, m \in Z\}$ $E_4=\{(k,1,beg,m) \rightarrow (k,l,end,m-B_{IN}^{(k,l)})|\forall k \geq 1, l \geq 0, m \in Z\}$ $E_5=\{(k,l,beg,m) \rightarrow (k+1,l',H,m-B_{OUT,(k+1,l')}^{(k,l)})|\forall l' \in d(k,l)$ and $\forall k \geq 1, l \geq 0, m \in Z\}$ The most efficient way for depicting this graph is to concentrate on the case of TCP connections in series rather than on a tree. This is done in, e.g., FIG. 6 where the $E_1$ arcs are the horizontal ones and the $E_2$ arcs are the vertical ones. The other arcs are marked on the figures.

To represent packet availability at the root, we create a set of vertices $\{(-1,0,1,m)|m \in Z\}$ with a weight equal to $T_m-T_{m-1}$. Additional edges going from $(0,0,beg,m) \rightarrow (-1,0,1,m)$ and from $(-1,0,1,m)$ $(-1,0,1,m-1)$, are added for all $m \in Z$.

An immediate induction based on the equations above gives that for all k,l,h,m:

$$x_m^{(k,l,h)} = \max_{\pi:(k,l,h,m) \rightarrow (-1,0,1,0)} \{\text{Weight}(\pi)\}. \quad (2)$$

Notice that Weight($\pi$), the length of a path $\pi$, leading from (k,l,h,m) to (-1,0,1,0), can be bounded by a constant multiplied by k+h+m, and also that a vertex in this graph has a finite number of neighbors, these two constants do not depend on the size and topology of the tree, as long as we assume that its out-degree (or fan-out) is bounded by a constant D.

For the loss and re-sequencing model, the model is based on the random graph framework introduced above. The self-clocking model of the TCP mechanism will remain the same as in the marking case. However, when a loss happens, retransmission packets are added as new branches of the random graph that have potential effects on later packets.

In the following discussion, vertices of the graph associated with the index m will refer either to packet m itself, or to a retransmitted packet that was sent after packet m and before packet m+1.

For the sake of clear exposition, the nominal case is studied first, where only one connection is considered in isolation and with sufficient buffer to receive all the data (so that it won't be influenced by back-pressure) and with a saturated source. In this case, packets are sent by the TCP sources as soon as the congestion window allows it (when the packet to be sent is at most the highest sequence number acknowledged plus CWND).

Fast retransmit fast recovery in the nominal case starts where one packet (with index m) is lost and no other neighboring packets are lost.

Departure of packet $m-W_m$ is triggered when the ACK of packets $m-W_m+1,\ldots,m-1$ are received, triggering the departure of packet $m+1,m+2$ up to $m+W_m$ (since the window necessarily increases of one unit on this interval and is hence equal to $W_m+1$ when packet $m+W_m$ is emitted). Packet m is lost but packets m+1,m+2, ... are received, triggering duplicate ACKS to be sent to the source. When the third duplicate ACK is received by the source (corresponding to the arrival of packet m+3), it starts the Fast Retransmit Fast Recovery Procedure. Retransmission of packets $m,m+1,\ldots,m+W_m$ are sent, and the current CWND is halved and inflated by three units. Most of the time (except for extreme case when $W_m \leq 3$) the emission of a packet is then stopped, as the highest sequence number received is m-1 and CWND was reduced to $(W_m+1)/2+3$. New packets, that were already sent, m+4,m+5, ... are then received, and each of them sends a new duplicate ACK back to the source, which inflates CWND one unit. Hence, packet $m+W_m+k$ is emitted when duplicate ACK corresponding to packet $m+(W_m+1)/2+k$ is received, as if the window observed by it is $(W_m-1)/2$. This phase ends when retransmitted packet m arrived immediately after packet $m+W_m$, which had triggered packet $m+W_m+(W_m-1)/2$. The normal increase evolution of the window is then resumed, with CWND equal to $(W_m+1)/2$ and the highest acknowledged sequence number being $m+W_m$. Packet $m+W_m+(W_m+1)/2$ is thus immediately sent.

To summarize, for packet $m+1, \ldots, m+W_m$, the window is evolving naturally with the additive increase. Then it is $\max((W_m-1)/2,1)$ for packets $m+W_m+1, \ldots, m+W_m+(W_m-1)/2$. Additive increase is then resumed for packet $m+W_m+(W_m+1)/2$ with window initially set to $(W_m+1)/2$.

The representation of the loss of a packet in the non-nominal case is more complex as some of the packets $m+1, m+2, \ldots, m+W_m$ might not have left the source when the loss of m is detected. The emission of these packets is allowed by the congestion window, but other constraints, for example back pressure and packet not available from previous node, might have delayed them.

Therefore, an exact model for the case with losses and re-sequencing is not built. Instead, a simplified and tractable model obtained via a set of conservative transformations is described. For proving the scalability of the case with losses and re-sequencing, namely the positiveness of throughput in the exact model for an infinite tree, it is enough to prove that the simplified conservative model scales in the same sense.

If m', where $m \leq m' \leq m+W_m$, is the index of the last packet emitted after m and before the loss was detected, window evolution for packets $m, m+1, \ldots, m'$ follows a normal additive increase. It is then fixed to $(W_{m'}-1)/2 \geq (W_m-1)/2$ until the retransmitted packet m is received immediately after packet m' arrives. When this happens, the latest packet that could possibly be sent is $$m'+\max((W_{m'}-1)/2,1) \leq m+W_m+\max((W_m-1)/2,1).$$

The window is set to $\max((W_m-1)/2,1)$ for $m+1, m+2, \ldots, m+W_m+\max((W_m-1)/2,1)-1$, and the additive increasing evolution of the window is resumed from packet $m+W_m+\max((W_m-1)/2,1)$ on. This is conservative in that the true system will have larger windows at all times and hence better throughput than the considered simplified model.

The retransmitted packets have been included at the last possible step of the communication, between $m+W_m$ and $m+W_m+1$, as in the nominal case. This tends to overload the network at intuitively the worst time, after the self clocking mechanism have resumed with a half window.

In the case where SACK is implemented by the TCP connection, the simplified model described here is still conservative with regard to the realistic window evolution. Only the lost packet is retransmitted, instead of an entire window.

Packets received at the destination end system under consideration are forwarded to its daughter nodes according to the order defined by the sequence number. When packet m is lost, as described above, packets $m+1, \ldots, m'$ are blocked in the input buffer of the receiving end system. They are released as soon as retransmission of packet m, sent between packets m' and m'+1, is received. Again, as the exact value of m' is not easy to evaluate, a conservative choice is made. Assuming that when packet m is lost, it has to wait for the arrival of the latest possible packet (i.e. $m+W_m$) and the retransmission. This in particular implies that packets $m+1, \ldots, m+W_m-1$ also occur this additional re-sequencing constraint.

In the random graph associated with the loss model, the vertex for end-system is (k,l). The data packet is m, and index h is v(k,l,h,m). For all $k \geq 1,l,h$ and m, a vertex v'(k,l,h,m) is added on top of v(k,l,h,m), which represents the potential retransmission of a packet just between packets m and m+1. In addition, the following edges are added to link to the vertical and horizontal structure:

Horizontal edges: v'(k,l,1,m)→v(k,l,beg,m) and v'(k,l,h,m)→v'(k,l,h−1,m) for h=2 . . . H, Vertical edges: v'(k,l,h,m)→v(k,l,h,m) for h=1 . . . H.

Not one of these edges goes from any v to any v. Therefore without further edge, these complementary vertices play no role.

In order to represent the effect of the loss and the retransmission of packet m on the TCP connection (k,l), edges $E_7$: v(k,l,h,m''+1)→v'(k,l,h,m'') for all h=1, . . . ,$H_{k,l}$ and m''=m , . . . ,m+$W_m$ to represent the retransmission of packet m (as the extra packet between indices $m+W_m-1$ and $m+W_m$) which delays the following packets and edge $E_6$: v(k,l,end,m)→v'(k,l,$H_{k,l}$,$m+W_m-1$) in order to represent the re-sequencing of packets $m, m+1, \ldots, m+W_m-1$, are added.

Figure 6:
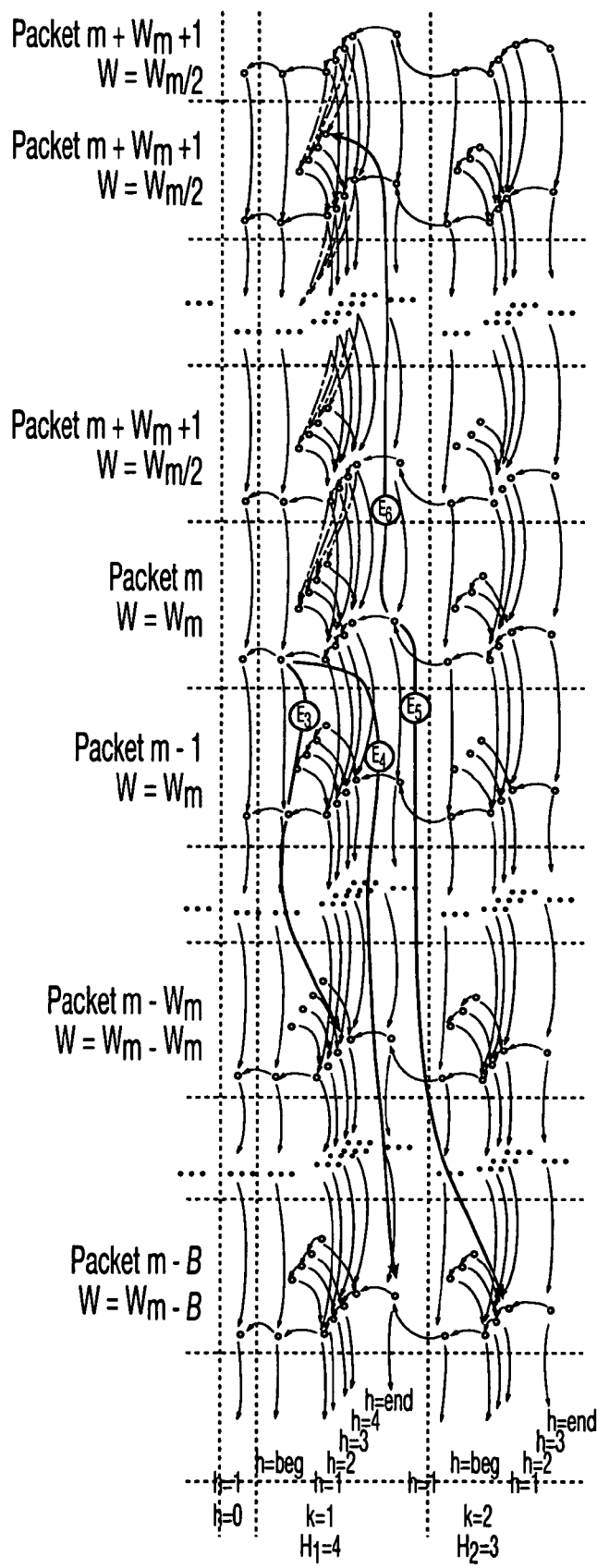
FIG. 6 is a random graph representing a series of TCP connections with retransmission and re-sequencing constraints.

The complete graph (including every type of array $E_1, \ldots, E_7$) is presented in the case of a line (rather than a tree) in FIG. 6. Edges belonging to $E_7$ are the vertical local arcs. Edges belonging to other classes than $E_1$ and $E_2$ have been represented only when they depart from station k and packet m, for readability purposes. The graph has been by assuming $B_{IN}=B_{OUT}=B$.

The following can be taken into account in the models. If the out-degree of some node of the tree is large, then the access link from this node may become the actual bottleneck due to the large number of simultaneous transfers originating from this node. Hence the throughput of the transfers originating from this node may in fact be significantly affected by the other transfers originating from the very same node.

This "last-mile link" effect can be incorporated in the present model. The extra traffic created by the transfers not located on the reference path can be represented by an increase of the aggregated service times, which represent the effect of cross traffic on some reference TCP transfer.

In order to keep this under control, the general idea is to keep a deterministic bound, say D, on the out degree of any node in the tree. Using arguments similar to those used above, it is easy to show that provided bandwidth sharing is fair on the last mile link, then the system where all aggregated service times on this link are multiplied by D is a conservative lower bound system in terms of throughput.

Hence, whenever the out-degree of any node is bounded by a constant, the proof of the scalability of throughput for the case without this last-mile effect extends to a proof of scalability with this effect taken into account.

Next, the throughput of the group communication when the size of the tree gets large is considered. For this, the possibility of infinite trees is considered.

A homogeneous model is the case where the following parameters apply. The tree has a fixed degree D. All TCP connections are structurally and statistically equivalent. The number of hops is the same in all connections. The packet marking or loss process is independent and identically distributed in all connections, with packet marking or loss probability p. Aggregated service times are independent and identically distributed in all routers, with law σ with finite mean. All back-pressure buffers are the same everywhere in the tree.

The non-homogeneous model is where the fan out degree in the multicast tree (described by indexes (k,l)) is bounded from above by a constant D. The numbers of hops of all routes are bounded from above by a constant, that is $H_{k,l} \geq H$ for all (k,l). The packet loss probability in TCP connection (k,l) is bounded from above by a constant p. The parameters $B_{IN}^{(k,l)}$ and $B_{OUT,(k',l')}^{(k,l)}$ are respectively bounded from below by constants $B_{IN}$ and $B_{OUT}$ that do not depend on (k,l) and (k',l'). The aggregated service times are independent and upper bounded (in the strong ordering sense) from above by a random variable σ with finite mean.

Let $x_m^{(k,l,h)}$ be defined as in Equation (2). For the homogeneous case and for a saturated source, the almost sure ("a.s.") limit $$\lim_{m \to \infty} \frac{m}{x_m^{(k,l,h)}} = \gamma \quad (3)$$

exists. This limit is deterministic and is independent of (k,l,h). The real number γ depends on the size and topology of the tree, on the number of routers in each overlay, on the evolution of the window, on the law of the aggregated service times modeling cross traffic, on the loss process in the TCP connections and on the parameters of the back-pressure mechanisms. It will be called the asymptotic group throughput of the multicast overlay.

For the non-homogeneous case, liminf $$\lim\inf_{m \to \infty} \frac{m}{x_m^{(k,l,h)}} \geq \gamma,$$

which again is deterministic and independent of (k,l,h). In this case, γ is the asymptotic group throughput of some lower bound system.

Path enumeration is used to study throughput in the light tailed case. The additional assumption will be the following: the random variable σ is light tailed, i.e. there exists a real number τ>0 such that $E[e^{t\sigma}] \leq A(t) < +\infty$ for all $0 \leq t \leq \tau$.

Therefore, consider a multicast overlay tree with infinite height k=0,1,2.... Under the assumptions that the law of σ is light tailed, with a bounded degree D and a bounded hop number H, the limsup $$\lim\sup_{m \to \infty} \frac{x_m^{(k,l,end)}}{m} \geq Const(H, D) > 0$$

uniformly in (k,l), both for the ECN and the loss-resequencing cases.

The random variable $x_m^{(k,l,end)}$ is the weight of the maximum weight path from (k,l,end,m) to (−1,0,1,0). In the ECN case, the function ø is given by ø(k,l,h,m)=(H+2)k+2(H+2)m+v(k,l,h) (with v(k,l,h)=h except for v(k,l,beg)=0, and v(k,l,end)=$H_{(k,l)}$+1) is strictly decreasing along any path in this graph.

As a consequence, a path from (k,l,h,m) to (−1,0,1,0) cannot come back to the same vertex, and the set of vertices contained in a path from (k,l,end,m) to (−1,0,1,0) cannot be larger than (H+2)k+2(H+2)m+2H+3.

As the maximum number of neighbors of a node in the graph is max(3, D+1), another corollary is that the number of such paths is bounded by:

$$(\max(3, D+1))^{(H+2)k+2(H+2)m+2H+3}.$$

Hence, using Markov's inequality, we get that for all π as:

$$P(\text{Weight}(\pi) \geq xm) \leq e^{-txm} E[e^{t\text{Weight}(\pi)}] \leq e^{-txm} A(t)^{(H+2)}$$
$$k+2(H+2)m+sh+3$$

Using that the probability of some union of events is upper bounded by the sum of the probabilities implies that for m≥k≥1 and for D≥2, $$P(x_m^{(k,l,end)} \geq xm) \leq (D+1)^{5(H+2)m} e^{-txm} A(t)^{5(H+2)m}.$$

If x is chosen large enough, in fact it is chosen such that $e^{tx} \geq (A(t)(2D+1))^{5(H+2)}$, the series of these probabilities function of m converges, so that from the Borel-Cantelli lemma, P(lim $\sup_{m \to \infty} x^{(k,l,end)}/m \leq x$)=1, proving the result.

For the loss and re-sequencing case, a new definition of the function ø is introduced for the associated graph: ø(m, k,h)=(H+2)m+(H+2)$W_{max}$k+v(h), where v(beg)=0; v(h)=h if $1 \leq h \leq H$ and v(end)=H +(H+2)($W_{max}$−1)+1, and $W_{max}$ is the maximum window size. In TCP, $W_{max}$=min($B_{in}$,$B_{out}$). Thus, it can be seen that this function decreases along any path in this random graph. The result given above can then be extended with the same proof to this case.

EXAMPLES

Simulations and experiments were conducted to support and to evaluate the theoretical investigations of the system and method of the present invention. In particular, an equation-based simulator was developed that is particularly efficient for the simulation of large trees. In addition, the reliable multicast architecture was prototyped and experiments conducted in the Planet-Lab environment. In addition, a discrete-event simulator was used to simulate the dynamics of the tree under the conditions of node failures, node departures and node additions.

Simulation studies were conducted to evaluate the scalability of the system and method of the present invention, in particular for the throughput obtained for long file transfers in large groups or trees of nodes. For this purpose a (max, plus) simulator was used based on the evolution equations discussed above. The main advantage of this equation-based simulator compared to the traditional discrete-event simulators is that it facilitates the handling of much larger trees, which is a key issue in the scalability analysis.

The simulation setting and assumptions are summarized as follows: For packet size and simulation length, all performance results are given in packets, that is the equivalent of two MSS.

For reference and compatibility with the Planet-Lab experiment, it is assumed that MSS=100B, so that a packet is 200B. In each simulation run, the transmissions of 10M packets (equivalent to 2 GB of data) are simulated.

Regarding tree topology, the results are reported only on the case of a balanced binary tree. The end-systems as well as the network connections are homogeneous. For TCP connections, the homogeneous case is considered, where each connection goes through 10 routers in series. All the packets transmitted on this connection have an independent probability p to get a negative feedback (loss or marking). The default option is p=0.01. Timeouts occurring are not considered due to large delay variations in a TCP connection.

Regarding network load, the cross traffic is characterized by the Aggregated Service Times in each router. In these simulations, both are considered Pareto random values with mean equal to 10 ms for each router/link. This incorporates propagation delays as well as queuing delays due to cross traffic. The default option is exponential.

The same experiments were repeated for different values of the buffer sizes. Only report results for the cases where $B_{IN}$ is set to 50 packets (i.e. 10 KB) and $B_{OUT}$ varies as 50, 100, 1000 and 10,000 packets (resp. 10 KB, 20 KB, 200 KB, 2 MB) are reported. In this scalability analysis, the size of the backup buffer does not have any effect. Thus, for these experiments we have $W_{max}=\min(B_{IN}, B_{OUT})=50$ packets.

For throughput scalability, complete binary trees of sizes up to 1023 nodes have been simulated, with different variants of handling of losses: TCP RENO type (with fast retransmit), TCP SACK and TCP over ECN. The impact of output buffer size is also considered.

Figure 7:
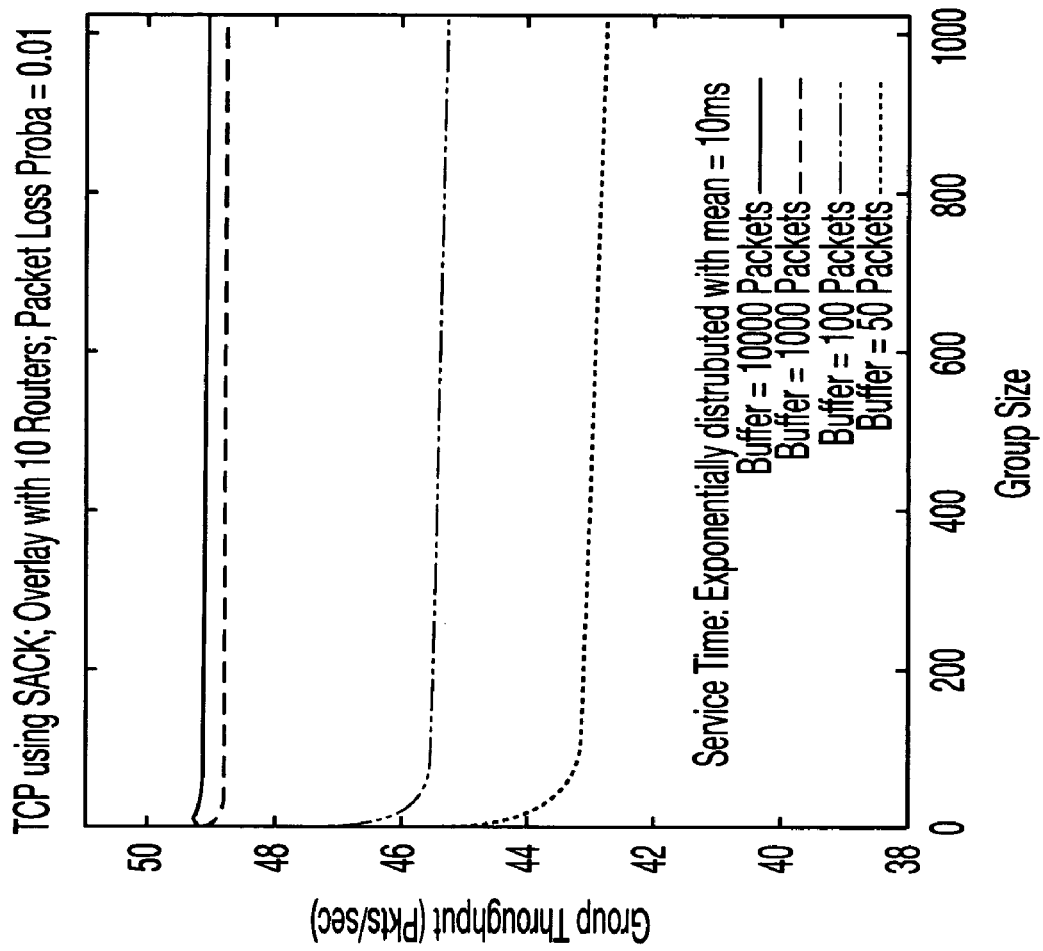
FIG. 7 is a graph of group throughput as a function of group size with TCP SACK, exponential cross traffic and different output buffer sizes.

FIG. 7 illustrates the throughput as a function of the group size in the case of TCP-SACK. It is easy to see that, quite intuitively, the group throughput is a decreasing function of the group size and an increasing function of the output buffer size. Observe that when the output buffer is large, more than 1000 packets, the throughput flattens out very quickly with small groups, i.e. less than 10 nodes. For smaller output buffers, the convergence to the asymptotic throughput can be observed when the group size reaches 100 nodes. The two other variants of TCP exhibit similar behavior with the same configuration. TCP without SACK has a throughput that is about 8% less than that of TCP SACK, whereas TCP ECN has slightly better throughput with about 2% improvement over TCP SACK.

In comparing asymptotic throughput and single connection throughput for the case without back pressure, the group throughput is equal to the minimum of those of the single connections without constraint on the packet availability at the senders. This throughput is referred to as local throughput. Thus, for the homogeneous case, this translates into the fact that the group throughput is identical to the local throughput. In the present invention, the relation does not hold due to the back pressure mechanisms. It is however interesting to know how far the group asymptotic throughput is from the local throughput. In Table I the ratio of these two quantities is given. It is worthwhile observing that the group throughput with large output buffers is very close to the local throughput. In other words, large output buffers alleviate in a very significant way the effect of the back pressure mechanisms. Even if the output buffer is small, say 50 packets (identical to the input buffer), the degradation of the group throughput due to back pressure mechanisms is moderate (less than 18%).

TABLE I

RATIO OF ASYMPTOTIC THROUGHPUT/ONE-CONNECTION THROUGHPUT

| Buffer (Pkts) | 10,000 | 1,000 | 100 | 50 |
|---|---|---|---|---|
| TCP RENO | .99 | .98 | .90 | .83 |
| TCP SACK | .99 | .99 | .92 | .86 |
| TCP ECN | .99 | .99 | .92 | .87 |

Figure 8:
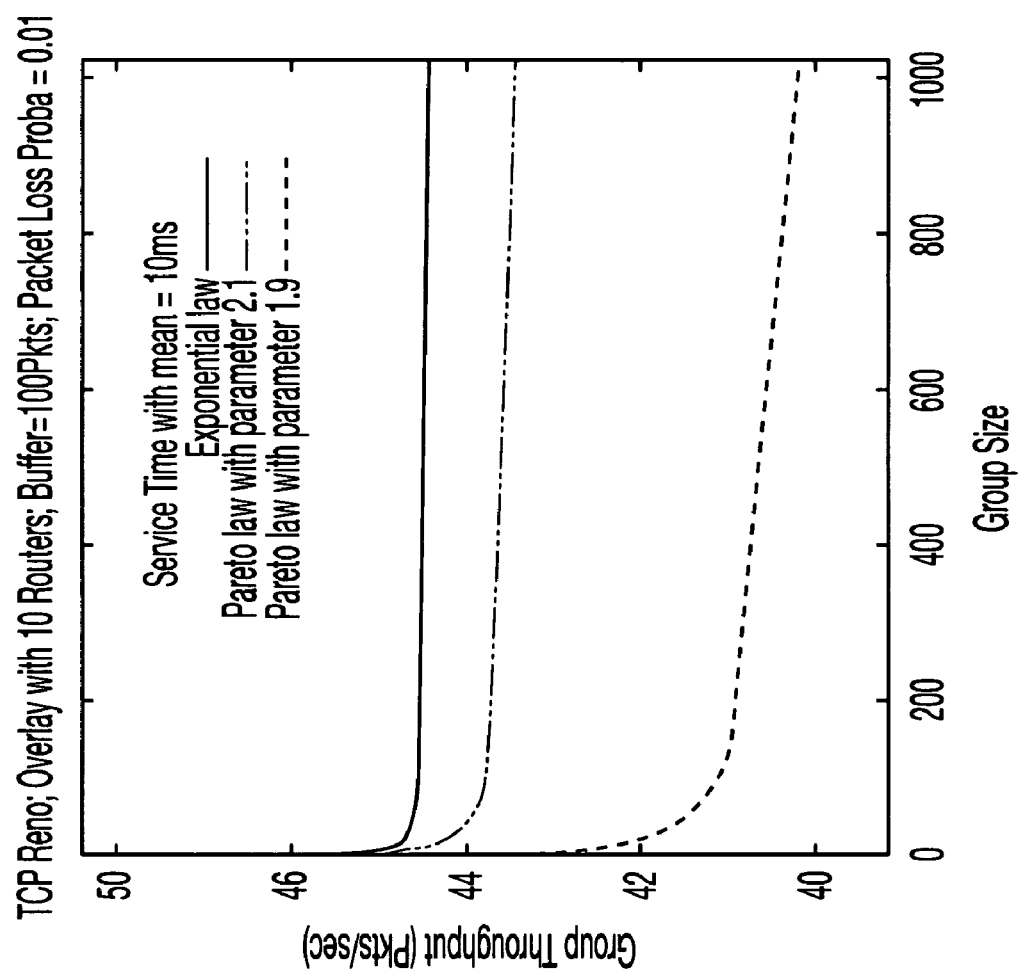
FIG. 8 is a graph of throughput for several laws of cross traffic.

In these examples, cross traffic at the routers is modeled through the aggregated service times. The scalability of the group throughput under the assumption of light tail of the aggregated service times is shown. Simulations are used to show the impact of this distribution, in particular, when it is heavy tailed. In FIG. 8, throughput is shown as a function of the group size for exponential and Pareto distributions with different parameters. FIG. 8 illustrates that the heavier the tail of the distribution, the smaller the throughput is. In addition, even for heavy tail distributions like Pareto, when the second moment exists, which is the case when the parameter is 2.1, the throughput curve has a shape similar to that of the exponential distribution. However, when the parameter is 1.9, the second moment no longer exists, and the throughput curve tends to decay faster. This suggests that the light tail distribution assumption could be relaxed and replaced by some moment conditions. Indeed, in the special tree case of chain, it can be shown that when the aggregated service times have a moment that is strictly higher than the second moment, then the group throughput is lower bounded by a strictly positive constant.

Figure 9:
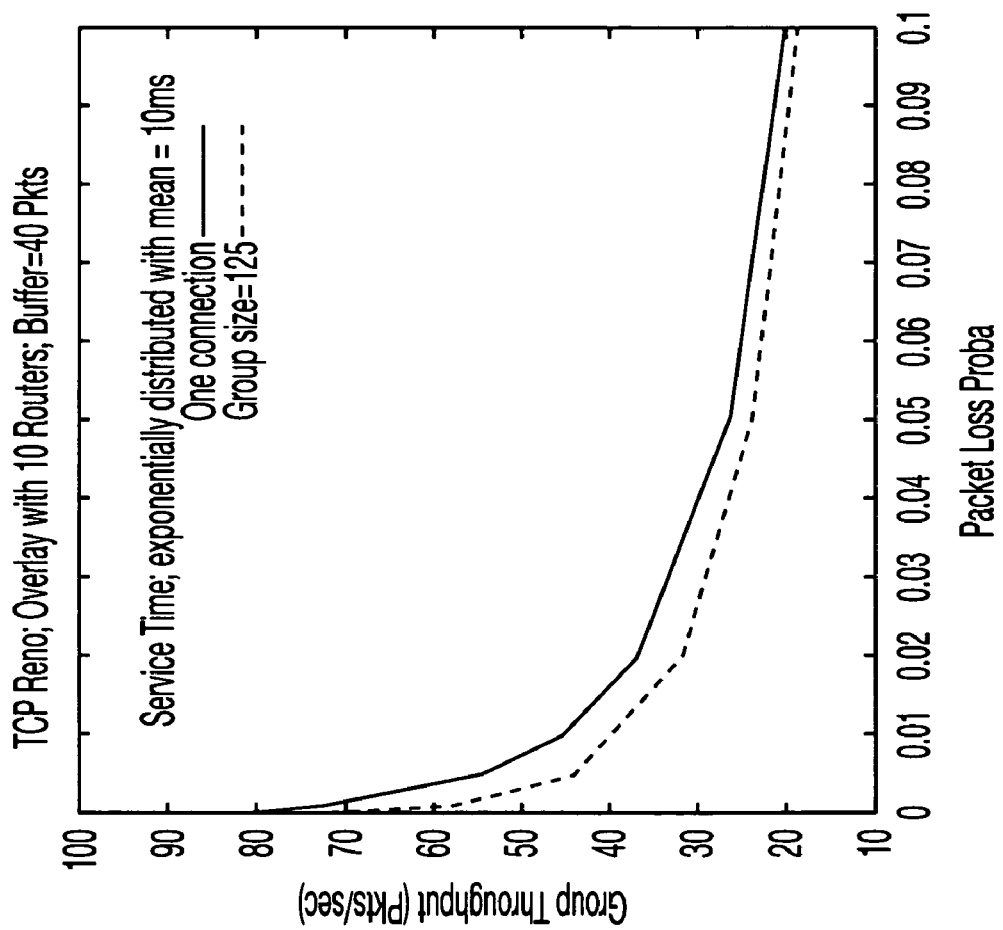
FIG. 9 is a graph of group throughput with respect to packet loss probability.

The asymptotic group throughput is relatively close to the throughput of single connection when the output buffer is large. The simulations suggest that, even with the back pressure mechanisms, the group throughput has a similar shape as that of the single-connection throughput. FIG. 9 illustrates the group throughput as a function of packet loss probability in a particular case. As illustrated, the single connection throughput (i.e. local throughput) is very close to those of the group of size 126.

In order to evaluate the practicality of the models, a prototype of TCP multicast overlaying system was implemented. Planet-Lab network was used, which gives access to computers located in universities and research centers over the world. The implementation runs a separate process for each output and input buffer, which are synchronized via semaphores and pipes. As soon as data is read from input buffer, they are available for outgoing transmissions. A separate semaphore is used to ensure that data is not read from input socket, if it can not be sent to output buffers, which creates back-pressure. A dedicated central node was used to monitor and control progress of experiments.

To analyze scalability of throughput, a balanced binary tree of 63 nodes was constructed and connected to the Internet. Simultaneous transmissions were started in balanced subtrees of sizes 15, 31 and 63 with the same source. Running experiments simultaneously avoided difficulties associated with fluctuations of networking conditions. In this way, link capacities are always shared between trees of different sizes in roughly equal proportions across the trees. Throughput was measured in packets per second, achieved on each link during transmission of 10 MB of data. Throughput of a link was measured by receiving node. Table II summarizes group throughput measurements for 3 different tree sizes and 3 different settings for output buffer size. Group throughput is computed as the minimum value of link throughput observed in the tree. Similar to the simulations presented above, the size of each packet is 200 bytes. In addition, the size of the input buffer is equal to 50 packets, and the size of the output buffer is variable. Output buffer size is given in packets.

TABLE II

SCALABILITY EXPERIMENTS IN PLANET-LAB: THROUGHPUT IN PKTS/SEC

| Group Size | 15 | 31 | 63 |
|---|---|---|---|
| Buffer = 50 Pkts | 95 | 86 | 88 |
| Buffer = 100 Pkts | 82 | 88 | 77 |
| Buffer = 1000 Pkts | 87 | 95 | 93 |

One can observe that the group throughput changes very little in the group size. This is consistent with the simulation results reported above, although as is quite expected, the absolute numbers are different.

To verify the approach to recovery after failures, a failure-resistant chain of 5 nodes running on Planet-Lab machines was implemented. During the transmission of 10 megabytes of data, two of 5 nodes fail. The failures were not simultaneous, and the system needs only to be resistant to one failure. In this experiment both input and output buffer size was limited to 50 packets. As in the previous experiment, size of each packet is 200 bytes (MSS=100 bytes). The failure recovery algorithm needs a backup buffer of size 150 in this case. Ten runs of this experiment were performed, and group throughput was measured. Reconnection time and the number of redundant packets that were retransmitted after the connection is restored. Recall that in the present architecture, the packet sequence numbers do not need to be advertised during the re-attachment procedure. Thus the daughter nodes of the failed node may receive duplicated packets after the connections are re-established. These redundant transmissions can impact the group throughput.

In our implementation, the failing node closes all its connections, and failure is detected by detecting dropped connections. After the failure is detected, the orphaned daughter node listens for an incoming connection from the surviving ancestor. The interval between the time when failure is detected and the time when connection is restored is measured. This time interval is measured separately at the two participating nodes: surviving mother (M), and daughter (D). The results of these measurements are summarized in Table III. The average reconnection time in seconds and number of retransmitted packets per one failure are given per one failure. The average group throughput is given per experiment. In these experiments, the average number of retransmitted packets is about half of the backup buffer size. The TCP sessions are re-established in a few seconds, in the same order as the TCP timeout. As the failure detection can be achieved in a few seconds as well, the experiment results show that the entire procedure of failure detection and reconnection can be completed in a few seconds.

TABLE III

END-TO-END RELIABILITY EXPERIMENTS IN PLANET-LAB

|  | min | average | max |
|---|---|---|---|
| Throughput (Pkts/sec) | 49.05 | 55.24 | 57.65 |
| # of Retransmitted Packets | 34 | 80.5 | 122 |
| Reconnection time (D) | 0.12 | 3.53 | 5.2 |
| Reconnection time (M) | 0.27 | 3.81 | 5.37 |

Simulation results presented above have shown that when there are no failures, the larger the buffers the more scalable the group throughput is. However, with larger buffers, the backup buffer size is increased proportionally in order to guarantee the end-to-end reliability. The above experiment showed that when failures do occur, the redundant transmissions will be increased as a consequence of larger backup buffers. These redundant transmissions will in turn reduce the group throughput.

To investigate into this issue, consider a chain of 10 nodes with 2, 4 and 6 failures (in a sequential way, so that the system just need to tolerate 1 failure). Table IV reports the throughput measurements obtained with these settings and with different output buffer sizes. The backup buffer size is set to the input buffer size and twice the output buffer size.

It is interesting to see that when the buffer sizes increase, the group throughput can actually decrease. These experiments show that the throughput monotonicity in buffer size no longer holds in the presence of failures. The more frequent the failures are, the more severe (negative) impact large buffers would have on the group throughput.

TABLE IV

SCALABILITY VS. END-TO-END RELIABILITY. THROUGHPUT IN KB/S

|  | Buf = 50 | buf = 200 | buf = 500 | buf = 1000 |
|---|---|---|---|---|
| 2 failures | 25.6 | 26.8 | 45.2 | 31.5 |
| 4 failures | 29.2 | 28.8 | 36.4 | 27.2 |
| 6 failures | 30.9 | 28.8 | 30.8 | 24.0 |

To complement the simulations and experiments presented above, a discrete-event simulator was developed to simulate the evolution of tree topology with failures and recovery under different algorithms. In particular, the heuristics for the tree reconstruction were evaluated.

Starting with a balanced binary tree of 1023 nodes, a failing node was chosen, and a random or greedy heuristic is applied to restore connectivity. The node was added back using best-join. The tree remained binary, and joins were only allowed at nodes with out-degree less than 2. The length of longest path and average degree of non-leaf nodes were measured. The two methods used for restoring connectivity were GREEDY_RECONNECT and a randomized procedure that reconnects orphaned subtrees to randomly chosen nodes with out-degree less than 2.

Figure 10:
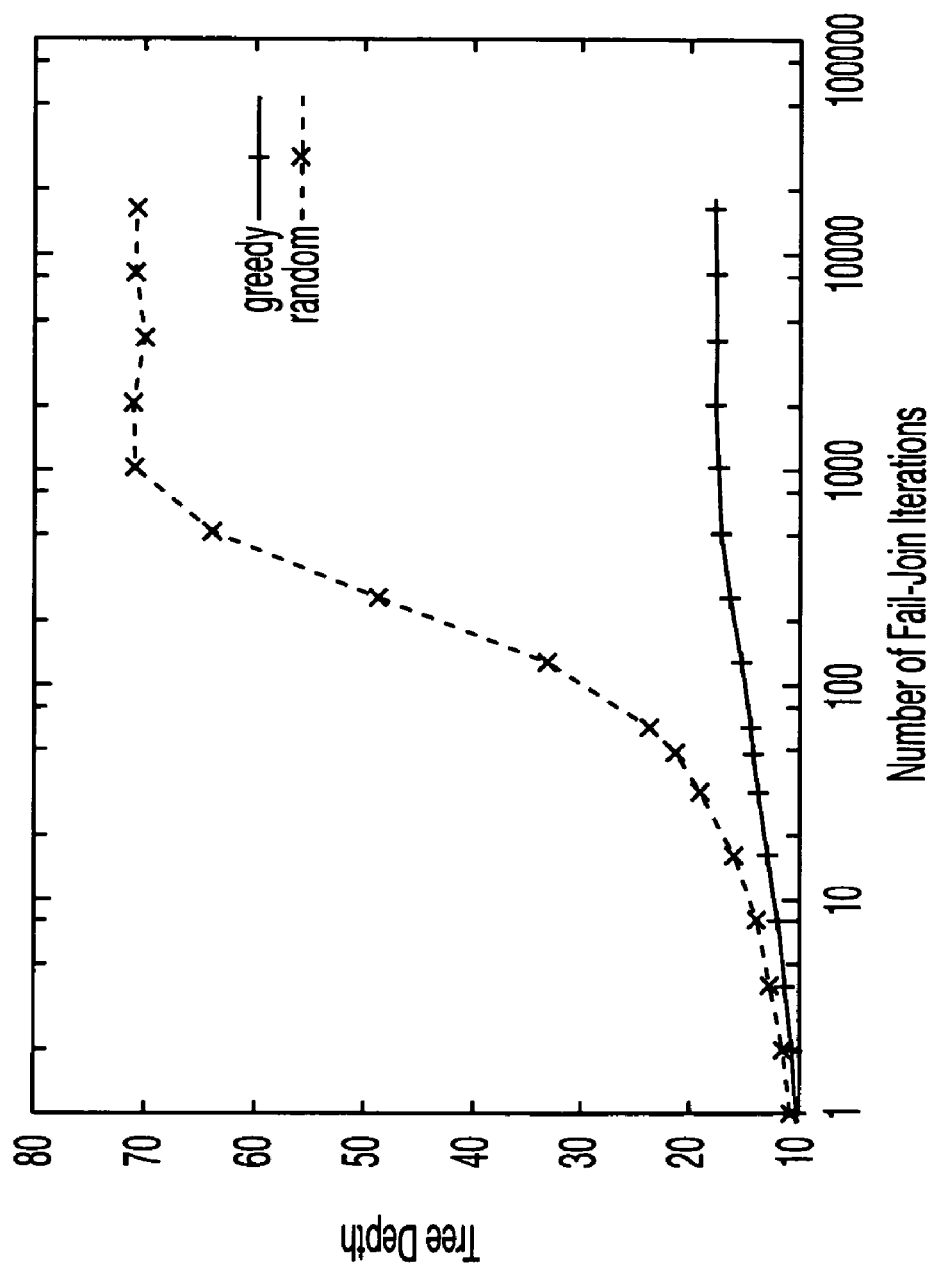
FIG. 10 is a graph of an example of the evolution of tree depth.
Figure 11:
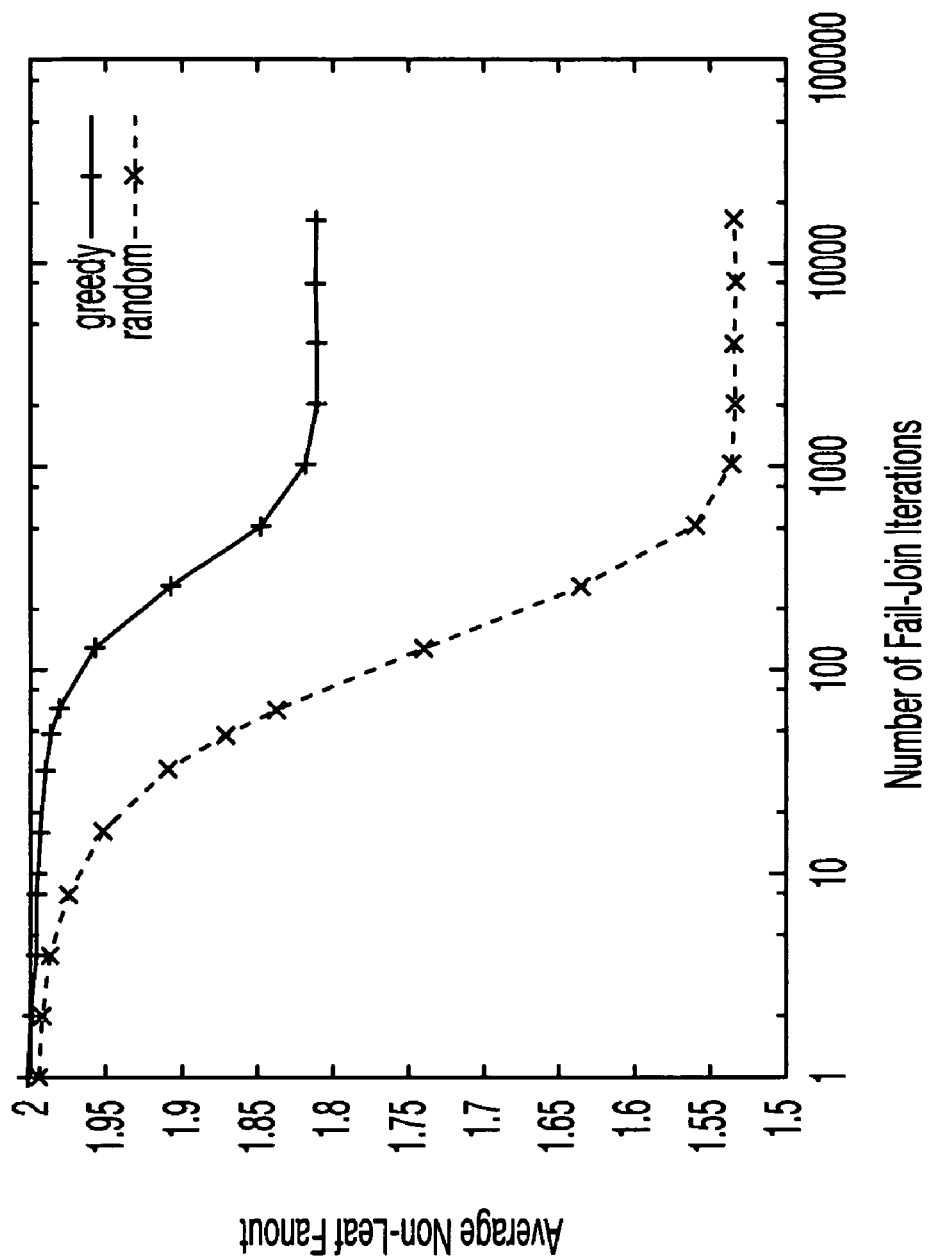
FIG. 11 is a graph of an example of the evolution of the average degree of non-leaf nodes.

The results are presented in FIGS. 10 and 11 for evolution of tree depth, FIG. 10 and evolution of average degree of non-leaf nodes, FIG. 11. These plots show average tree depth and inner node fan-out for over 500 runs. GREEDY_RECONNECT helps to maintain significantly lower tree depth, and higher inner node degree, compared to the trivial approach that chooses active nodes randomly.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

What is claimed is:

1. A method for delivering data packets from a source node to a plurality of end-system nodes in a multicast overlay network tree with scalable group communication throughput and end-to-end reliability, the method comprising:

providing at least one backup buffer in each one of a group of end-system nodes in the multicast network tree;

storing copies of data packets transferred from an input buffer to an output buffer in one of the group of end-system nodes in the backup buffer;

sizing the back-up buffer in accordance with maximum sizes of the input and output buffers and a number of simultaneous end-system node failures to be accommodated in the multicast overlay network; and preventing data packet losses between end-system nodes in the multicast overlay tree using communication protocols or backpressure mechanisms.

2. The method of claim 1, wherein the step of storing copies of data packets further comprises storing copies of data packets transferred from an input buffer to each one of a plurality of output buffers in a single end-system node, each output buffer corresponding to a separate downstream connection.

3. The method of claim 1, wherein the step of preventing data packet losses comprises preventing overflow in the input buffers located in the end-system nodes using the backpressure mechanisms by communicating available space in an input buffer of a given node to other nodes in the multicast overlay tree; and communicating significant reductions in available space in the input buffer of the given node to the other nodes.

4. The method of claim 1, wherein the step of preventing data packet losses comprises preventing overflow in the output buffers located in the end-system nodes using the backpressure mechanisms by blocking transfer of a data packet from an input buffer to an output buffer of a given node unless sufficient space exists in the output buffer to accommodate the data packet.

5. A method for delivering data packets from a source node to a plurality of end-system nodes in a multicast overlay tree with scalable group communication throughput and end-to-end reliability, the method comprising:
providing at least one backup buffer in each one of a group of end-system nodes in the multicast network tree;
storing copies of data packets transferred from an input buffer to an output buffer in one of the group of end-system nodes in the backup buffer;
sizing the back-up buffer in accordance with maximum sizes of the input and output buffers and a number of simultaneous end-system node failures to be accommodated in the multicast overlay network;
detecting at least one end-system node failure in the multicast overlay tree; and
reconnecting orphaned end-system nodes created by the failure of the one end-system node to the multicast overlay tree to provide reliable data packet transfer to all remaining end-system nodes in the multicast overlay tree while maintaining the delivery of a complete sequence of data packets from the source node to each one of the remaining end-system nodes.

6. The method of claim 5, wherein the step of detecting at least one end-system node failure further comprises detecting a plurality of simultaneous end-system node failures, and the step of reconnecting orphaned end-system nodes further comprises simultaneously reconnecting to the multicast overlay tree all of the orphaned end-system nodes that were created by the plurality of end-system node failures.

7. The method of clam 5, further comprising using overlay tree topology stored in one or more end-system nodes to facilitate reconnecting the orphaned end-system nodes to the multicast overlay tree.

8. The method of claim 5, wherein the step of detecting at least one end-system node failure comprises using heart beat probes or using keep-alive signals.

9. The method of claim 5, wherein the step of reconnecting orphaned end-system nodes further comprises:
reconnecting each orphaned end-system node of the failed end-system node to a substitute mother node belonging to a subtree of a surviving ancestor node of the failed end-system node; and
retransmitting copies of data packets stored in the backup buffer in the surviving ancestor node through the subtree.

10. The method of claim 9, wherein the surviving ancestor node is the first surviving node in a path from the failed end-system node to the source node.

11. The method of claim 9, wherein the step of reconnecting each one of the orphaned nodes further comprises using a greedy heuristic.

12. The method of claim 11, wherein the step of using the greedy heuristic comprises: selecting an orphaned subtree having a largest depth from a plurality of orphaned subtrees rooted at orphaned daughter nodes of the failed end-system node;
choosing a substitute mother node that is closest to the source node;
connecting the selected orphaned subtree to the chosen substitute mother node; and
repeating the selection of orphaned subtrees until all orphaned subtrees have been connected to substitute mother nodes.

13. The method of claim 9, wherein the step of retransmitting copies of data packets stored in the backup buffer comprises providing each reconnected orphaned node with a sufficient amount of copies of data packets such that each reconnected orphaned node receives a complete sequence of data packets from the source node.

14. The method of claim 9, further comprising:
distributing information about the reconnected orphaned nodes in the multicast overlay tree up the tree to the source node; and
distributing ancestor end-system node information to the reconnected orphaned nodes.

15. The method of claim 5, further comprising:
forwarding the stored copies of the data packets from each backup buffer to the reconnected orphaned nodes.

16. The method of claim 5, wherein each backup buffer, input buffer and output buffer comprises a finite size.

17. The method of claim 5, wherein the size of each backup buffer is $B_{BACK}$, and $B_{BACK} \geq m)B_{OUT}^{max}+B_{IN}^{max})+B_{OUT}^{max}$, where $B_{OUT}^{max}$ is a maximum output buffer size, $B_{IN}^{max}$ is a maximum input buffer size and in is the number of simultaneous end-system node failures that can be accommodated by the data packet copies stored in the backup buffer.

18. The method of claim 5, further comprising disconnecting an end-system node from the multicast overlay tree by:
notifying a mother node and all daughter nodes of the end-system node to be disconnected about of the pending disconnection;
disconnecting the end-system node from the mother node and all of the daughter nodes;
reconnecting each disconnected daughter node of the disconnected end-system node to a substitute mother node belonging to a subtree of a surviving ancestor node of the disconnected end-system node; and
retransmitting copies of data packets stored in a backup buffer in the surviving ancestor node through the subtree.

19. The method of claim 5, further comprising connecting a new end-system node to the multicast overlay tree by:
contacting the source node;
identifying a mother node for connecting a new end-system node; and
connecting the new end-system node to the identified mother node.

20. The method of claim 19, further comprising notifying the new end-system node regarding buffer size constraints in the multicast overlay tree.

21. The method of claim 19, wherein the identified mother node comprises a distant leaf node to provide the great amount of transmitted data from the source node to the new end-system node.

22. The method of claim 19, wherein the step of identifying a mother node comprises identifying an active end-system node having sufficient available out-degree capacity to accommodate the new end-system node.

23. The method of claim 19, further comprising distributing updated topology information throughout the multicast overlay tree.

24. A method for delivering data packets from a source node to a plurality of end-system nodes in an multicast overlay tree with scalable group communication throughput and end-to-end reliability, the method comprising:
providing at least one backup buffer in each one of a group of end-system nodes in the multicast network tree;
storing copies of data packets transferred from an input buffer to an output buffer in one of the group of end-system nodes in the backup buffer;
sizing the back-up buffer in accordance with maximum sizes of the input and output buffers and a number of simultaneous end-system node failures to be accommodated in the multicast overlay network;
preventing data packet losses between end-system nodes in the multicast overlay tree using communication protocols or backpressure mechanisms;
detecting at least one end-system node failure in the multicast overlay tree; and
reconnecting orphaned end-system nodes created by the failure of the one end-system node to the multicast overlay tree to provide reliable data packet transfer to all remaining end-system nodes in the multicast overlay tree while maintaining the delivery of a complete sequence of data packets from the source node to each one of the remaining end-system nodes.

25. The method of claim 24, wherein the step of preventing data packet losses comprises:
using a transmission control protocol to transfer data packets between end-system nodes in the multicast overlay tree; and
preventing overflow in input and output buffers in the end-system nodes using the backpressure mechanisms.

26. The method of claim 25, wherein the backpressure mechanisms comprise:
communicating available space in an input buffer of a given end-system node to other end-system nodes in the multicast overlay tree;
communicating significant reductions in available space in the input buffer of the given end-system node to the other end-system nodes; and
blocking transfer of a data packet from the input buffer to an output buffer of the given end-system node unless sufficient space exists in the output buffer to accommodate the data packet.

27. The method of claim 24, wherein the step of detecting at least one end-system node failure further comprises detecting a plurality of simultaneous end-system node failures, and the step of reconnecting orphaned end-system nodes further comprises simultaneously reconnecting to the multicast overlay tree all of the orphaned end-system nodes created by the plurality of end-system node failures by:
reconnecting each orphaned node of each failed node to substitute mother nodes belonging to subtrees of surviving ancestor nodes of the failed nodes; and
copies of data packets stored in the backup buffers in the surviving ancestor nodes through all subtrees.

28. The method of claim 27, wherein the step of reconnecting each one of the orphaned nodes comprises using a greedy heuristic comprising:
selecting an orphaned subtree having a largest depth from a plurality of orphaned subtrees rooted at orphaned daughter nodes of the failed node;
choosing a substitute mother node that is closest to the source node;
connecting the selected orphaned subtree to the chosen substitute mother node; and
repeating the selection of orphaned subtrees until all orphaned subtrees have been connected to substitute mother nodes.

29. The method of claim 27, further comprising:
distributing information about the reconnected orphaned nodes in the multicast overlay tree up the tree to the source node; and
distributing ancestor end-system node information to the reconnected orphaned nodes.

30. The method of claim 24, further comprising:
forwarding the stored copies of the data packets from each backup buffer to the reconnected orphaned nodes.

31. The method of claim 24, wherein the size of each backup buffer is $B_{BACK}$, and $B_{BACK} \geq m(B_{OUT}^{max} + B_{IN}^{max}) + B_{OUT}^{max}$, where $B_{OUT}^{max}$ is a maximum output buffer size, $B_{IN}^{max}$ is a maximum input buffer size and ,n is the number of simultaneous end-system node failures that can be accommodated by the data packet copies stored in the backup buffer.

32. The method of claim 24, further comprising disconnecting an end-system node from the multicast overlay tree by:
notifying a mother node and all daughter nodes of the end-system node to be
disconnected about of the pending disconnection;
disconnecting the end-system node from the mother node and all of the daughter nodes;
reconnecting each disconnected daughter node of the disconnected end-system node to a substitute mother node belonging to a subtree of a surviving ancestor node of the disconnected end-system node; and
retransmitting copies of data packets stored in a backup buffer in the surviving ancestor node through the subtree.

33. The method of claim 24, further comprising connecting a new end-system node to the multicast overlay tree by:
contacting the source node;
identifying a mother node having sufficient available out-degree capacity to accommodate the new end-system node;
connecting the new end-system node to the identified mother node;
notifying the new end-system node regarding buffer size constraints in the multicast overlay tree; and
distributing updated topology information throughout the multicast overlay tree.

34. A computer readable medium encoded with computer executable instructions, the computer executable instructions when read by a computer causes the computer to perform a method for delivering data packets from a source node to a plurality of end-system nodes in a multicast overlay tree with scalable group communication throughput and end-to-end reliability, the method comprising:
providing at least one backup buffer in each one of a group of end-system nodes in the multicast network tree;
storing copies of data packets transferred from an input buffer to an output buffer in one of the group of end-system nodes in the backup buffer;
sizing the back-up buffer in accordance with maximum sizes of the input and output buffers and a number of simultaneous end-system node failures to be accommodated in the multicast overlay network; and
preventing data packet losses between end-system nodes in the multicast overlay tree using communication protocols or backpressure mechanisms.

35. The computer readable medium of claim 34, wherein the step of preventing data packet losses comprises:
using a transmission control protocol to transfer data packets between end-system nodes in the multicast overlay tree; and
preventing overflow in input and output buffers in the end-system nodes using the backpressure mechanisms.

36. The computer readable medium of claim 35, wherein the backpressure mechanisms comprise:
communicating available space in an input buffer of a given end-system node to other end-system nodes in the multicast overlay tree;
communicating significant reductions in available space in the input buffer of the given end-system node to the other end-system nodes; and
blocking transfer of a data packet from the input buffer to an output buffer of the given end-system node unless sufficient space exists in the output buffer to accommodate the data packet.

37. A computer readable medium encoded with computer executable institutions, the computer executable instructions when read by a computer causes the computer to perform a method for delivering data packets from a source node to a plurality of end-system nodes in a multicast overlay tree with scalable group communication throughput and end-to-end reliability, the method comprising: providing at least one backup buffer in each one of a group of end-system nodes in the multicast network tree;
storing copies of data packets transferred from an input buffer to an output buffer in one of the group of end-system nodes in the backup buffer;
sizing the back-up buffer in accordance with maximum sizes of the input and output buffers and a number of simultaneous end-system node failures to be accommodated in the multicast overlay network; and
detecting at least one end-system node failure in the multicast overlay tree; and
reconnecting orphaned end-system nodes created by the failure of the one end-system node to the multicast overlay tree to provide reliable data packet transfer to all remaining end-system nodes in the multicast overlay tree while maintaining the delivery of a complete sequence of data packets from the source node to each one of the remaining end-system nodes.

38. The computer readable medium of claim 37, wherein the step of reconnecting orphaned end-system nodes further comprises:
reconnecting each orphaned end-system node of the failed end-system node to a substitute mother node belonging to a subtree of a surviving ancestor node of the failed end-system node; and
retransmitting copies of data packets stored in a backup buffer in the surviving ancestor node through the subtree.

39. The computer readable medium of claim 38, wherein:
the surviving ancestor node is the first surviving node in a path from the failed end-system node to the source node; and
the step of reconnecting each one of the orphaned end-system nodes comprises using a greedy heuristic.

40. The computer readable medium of claim 39, wherein the step of using the greedy heuristic comprises:
selecting an orphaned subtree having a largest depth from a plurality of orphaned subtrees rooted at orphaned daughter nodes of the failed end-system node;
choosing a substitute mother node that is closest to the source node;
connecting the selected orphaned subtree to the chosen substitute mother node; and
repeating the selection of orphaned subtrees until all orphaned subtrees have been connected to substitute mother nodes.

41. The computer readable medium of claim 37, wherein the step of detecting at least one end-system node failure further comprises detecting a plurality of simultaneous end-system node failures, and the step of reconnecting orphaned end-system nodes further comprises simultaneously reconnecting to the multicast overlay tree all of the orphaned end-system nodes created by the plurality of end-system node failures by:
reconnecting each orphaned node of each failed node to substitute mother nodes belonging to subtrees of surviving ancestor nodes of the failed nodes; and
retransmitting copies of data packets stored in backup buffers in the surviving ancestor nodes through all subtrees.

42. The computer readable medium of claim 37, wherein the method further comprises:
forwarding the stored copies of the data packets from each backup buffer to the reconnected orphaned nodes;
wherein the size of each backup buffer is $B_{BACK}$, and $B_{BACK} \geq m(B_{OUT}^{max} + B_{IN}^{max}) + B_{OUT}^{max}$, where $B^{OUTmax}$ is a maximum output buffer size, $B_{IN}^{max}$ is a maximum input buffer size and in is the number of simultaneous node failures that can be accommodated by the data packet copies stored in the backup buffer.

43. The computer readable medium of claim 37, wherein the method further comprises disconnecting an end-system node from the multicast overlay tree by:
notifying a mother node and all daughter nodes of the end-system node to be disconnected about of the pending disconnection;
disconnecting the end-system node from the mother node and all of the daughter nodes;
reconnecting each disconnected daughter node of the disconnected end-system node to a substitute mother node belonging to a subtree of a surviving ancestor node of the disconnected end-system node; and
retransmitting copies of data packets stored in a backup buffer in the surviving ancestor node through the entire subtree.

44. The computer readable medium of claim 37, wherein the method further comprises connecting a new end-system node to the multicast overlay tree by:
contacting the source node;
identifying a mother node having sufficient available out-degree capacity to accommodate the new end-system node;

connecting the new end-system node to the identified mother node;

notifying the new end-system node regarding buffer size constraints in the multicast overlay tree; and distributing updated topology information throughout the multicast overlay tree.

* * * * *